(12) United States Patent
Watanabe et al.

(10) Patent No.: US 8,007,175 B2
(45) Date of Patent: Aug. 30, 2011

(54) HYDRODYNAMIC BEARING DEVICE, AND SPINDLE MOTOR AND INFORMATION APPARATUS EQUIPPED WITH SAME

(75) Inventors: Yoshihito Watanabe, Ehimie (JP); Hiroyuki Kiriyama, Ehime (JP)

(73) Assignee: Panasonic Corporation, Osaka (JP)

( * ) Notice: Subject to any disclaimer, the term of this patent is extended or adjusted under 35 U.S.C. 154(b) by 466 days.

(21) Appl. No.: 12/262,656

(22) Filed: Oct. 31, 2008

(65) Prior Publication Data
US 2009/0129709 A1 May 21, 2009

(30) Foreign Application Priority Data

Nov. 8, 2007 (JP) .................... 2007-290324
Aug. 25, 2008 (JP) .................... 2008-214946

(51) Int. Cl.
*F16C 32/06* (2006.01)
(52) U.S. Cl. ........................ 384/100; 384/107
(58) Field of Classification Search .............. 384/100, 384/107, 114
See application file for complete search history.

(56) References Cited

U.S. PATENT DOCUMENTS

| 7,005,768 | B2 | 2/2006 | Tamaoka et al. | |
|---|---|---|---|---|
| 2007/0071375 | A1* | 3/2007 | Kodama et al. | 384/100 |
| 2007/0206889 | A1* | 9/2007 | Obara et al. | 384/100 |
| 2007/0286538 | A1* | 12/2007 | Mizutani | 384/112 |
| 2009/0103841 | A1* | 4/2009 | Uenosono et al. | 384/100 |

FOREIGN PATENT DOCUMENTS

| JP | 2003-120662 | 4/2003 |
|---|---|---|
| JP | 2004-135419 | 4/2004 |
| JP | 2004-176816 | 6/2004 |

* cited by examiner

*Primary Examiner* — Thomas R Hannon
(74) *Attorney, Agent, or Firm* — Wenderoth, Lind & Ponack, L.L.P.

(57) ABSTRACT

The cross sectional shape of an axial direction communicating path when viewed in the axial direction is flat in the circumferential direction, and the cross sectional area of the communicating path gradually decreases moving from the center of the cross section toward the both ends in the circumferential direction. When a sleeve and a cover member are bonded with an adhesive, the adhesive is actively made to flow into an adhesive inflow portion.

22 Claims, 25 Drawing Sheets

HYDRODYNAMIC BEARING DEVICE, AND SPINDLE MOTOR AND INFORMATION APPARATUS EQUIPPED WITH SAME

BACKGROUND OF THE INVENTION

1. Field of the Invention

The present invention relates to a hydrodynamic bearing device that is installed in a spindle motor that is used for hard disk devices and other such magnetic disk devices, optical disk devices, laser scanning devices, and other such information apparatuses, and that rotationally drives a disk, a polygon mirror, or another such rotor in this device.

2. Description of the Related Art

Hydrodynamic bearing devices in which the fluid pressure of an oil or other such lubricant interposed between a shaft and a sleeve is utilized to support these components so as to be relatively rotatable have been proposed in the past as bearings for spindle motors used in various kinds of information apparatuses that rotationally drive a magnetic disk, an optical disk, a magneto optical disk, or another such disk-shaped recording medium, or a polygon mirror or the like.

It is extremely important to design a hydrodynamic bearing device so that the lubricant does not leak out from between the bearing constituent members. Accordingly, there have been numerous proposals related to constitutions in which a communicating path is provided inside the bearing for the purpose of eliminating pressure unevenness within the bearing, and an adhesive is used to fix and seal the members that make up the bearing.

For example, as shown in Patent Documents 1 (Japanese Laid-Open Patent Application 2003-120662), a constitution is disclosed in which, in bonding a sleeve (serving as a bearing member) and a housing member that supports this sleeve, a communicating path is formed between the inner peripheral surface of the housing member and the outer peripheral surface of the sleeve, and an adhesive reservoir extending in the axial direction is formed around this communicating path in the circumferential direction. With this constitution, the adhesive is prevented from working its way into the communicating path by capturing the adhesive in the adhesive reservoir.

With another communicating path constitution, such as that in Patent Documents 2 (Japanese Laid-Open Patent Application 2004-135419), for example, an outer cylinder member is rotatably inserted via a gap at the inner periphery of a sleeve serving as a bearing member, and an inner shaft formed integrally with a rotor hub is inserted and fixed at the inner periphery of this outer cylinder member. Here, a spiral communicating path and an adhesive groove are provided between the inner shaft and the outer cylinder member, and the two are fitted together and fixed after coating the adhesive groove with an adhesive. This prevents the adhesive from entering the communicating path.

SUMMARY OF THE INVENTION

Nevertheless, Patent Documents 1 and 2 both involve a constitution in which an adhesive reservoir or a spiral adhesive groove is provided to keep the adhesive out of the communicating path. Therefore, the amount of adhesive has to be adjusted so that excess adhesive will not ooze into the communicating path, or in other words, so that the adhesive will not completely plug up the adhesive reservoir or the adhesive groove. As a result, even if a communicating path is ensured, any portions where there is not enough adhesive will already be lacking in adhesive strength at the initial assembly stage.

Furthermore, if there is not enough adhesive at portions where adhesive is supposed to be present, the lubricant may seep into this places. If the product is subjected to a heat cycle or heat shock in this state, there is the risk that the lubricant will work its way in between the adhesive and the bonded member by a wedge effect, and the bond will gradually come apart. As a result, from a long-term standpoint, this ends up reducing adhesive strength. Also, since the lubricant works its way into the bond gap, there is the risk that the lubricant may run low in the bearing sooner than normal.

It is an object of the present invention to provide a hydrodynamic bearing device with which a communicating path is effectively ensured in the bonding assembly of the bearing member having the communicating path, good adhesive strength is ensured between the members being bonded, and the filled lubricant can be effectively prevented from finding its way into the bonded region, as well as a spindle motor and an information apparatus in which this hydrodynamic bearing device is installed.

The hydrodynamic bearing device pertaining to the first invention comprises a shaft, a sleeve, a cover member, a communicating path, a lubricant, a hydrodynamic bearing portion, and an adhesive inflow portion. The sleeve has a bearing hole in which the shaft is relatively rotatably inserted via a tiny gap. The cover member is fixed to the sleeve with an adhesive so as to cover at least part of the end surface of the sleeve at one end in the axial direction, or at least part of the cylinder surface on the outer peripheral side of the sleeve. The communicating path is formed between the cylinder surface on the outer peripheral side of the sleeve and the inner peripheral surface of the cover member and passes through in the axial direction from the end surface at one end toward the end surface at the other end in the axial direction, or is formed between the end surface at one end of the sleeve and the cover member and passes through from the bearing hole to the outer peripheral side of the sleeve in the radial direction. The lubricant is filled in a space including at least the tiny gap and the communicating path. The hydrodynamic bearing portion rotates and floats the shaft relative to the sleeve when the shaft and the sleeve rotate relatively to one another. The adhesive inflow portion is disposed on both sides in the circumferential direction of the communicating path and is where the adhesive, which fixes the sleeve and the cover member, flows in.

The hydrodynamic bearing device pertaining to the second invention is the hydrodynamic bearing device pertaining to the first invention, wherein the adhesive inflow portion is formed such that when the communicating path is viewed in its direction of extension, the cross sectional shape is flat in the circumferential direction, and the cross sectional area (in other words, the interval between adjacent wall faces) gradually decreases moving from the center of the cross section toward the both ends in the circumferential direction.

The hydrodynamic bearing device pertaining to the third invention is the hydrodynamic bearing device pertaining to the first invention, wherein, of the wall faces on the cover member side and the sleeve side that constitute the communicating path, the one with the smaller radius of curvature when the communicating path is viewed in its direction of extension has a smaller contact angle with the adhesive in an uncured state.

The hydrodynamic bearing device pertaining to the fourth invention is the hydrodynamic bearing device pertaining to the first invention, wherein, of the wall faces on the cover member side and the sleeve side that constitute the communicating path, the one with the smaller radius of curvature when the communicating path is viewed in its direction of extension has a greater surface roughness.

The hydrodynamic bearing device pertaining to the fifth invention is the hydrodynamic bearing device pertaining to the first invention, wherein the coefficient of thermal expansion of the sleeve is greater than the coefficient of thermal expansion of the cover member.

The hydrodynamic bearing device pertaining to the sixth invention comprises a center shaft member, an outer cylinder member, a sleeve, a communicating path, a lubricant, and an adhesive inflow portion. The center shaft member has a flange on at least one end in the axial direction. The outer cylinder member is fitted over the center shaft member and is fixed to the center shaft member with an adhesive. The sleeve has a bearing hole in which the outer cylinder member is relatively rotatably inserted via a tiny gap. The communicating path is formed between the outer cylinder member and the center shaft member and passes through from one end in the axial direction toward the other end in the axial direction, or is formed between the flange of the center shaft member and the end of the outer cylinder member and passes through in the radial direction from the bearing hole to the inner peripheral surface of the outer cylinder member. The lubricant is filled in a tiny space including at least the tiny gap and the communicating path. The adhesive inflow portion is disposed on both sides in the circumferential direction of the communicating path and is where the adhesive, which fixes the center shaft member and the outer cylinder member, flows in.

The hydrodynamic bearing device pertaining to the seventh invention is the hydrodynamic bearing device pertaining to the sixth invention, wherein the adhesive inflow portion is formed such that when the communicating path is viewed in its direction of extension, the cross sectional shape is flat in the circumferential direction, and the cross sectional area (in other words, the interval between adjacent wall faces) gradually decreases moving from the center of the cross section toward the both ends in the circumferential direction.

The hydrodynamic bearing device pertaining to the eighth invention is the hydrodynamic bearing device pertaining to the sixth invention, wherein, of the wall faces on the center shaft member side and the outer cylinder member side that constitute the communicating path, the one with the smaller radius of curvature when the communicating path is viewed in its direction of extension has a smaller contact angle with the adhesive in an uncured state.

The hydrodynamic bearing device pertaining to the ninth invention is the hydrodynamic bearing device pertaining to the sixth invention, wherein, of the wall faces on the center shaft member side and the outer cylinder member side that constitute the communicating path, the one with the smaller radius of curvature when the communicating path is viewed in its direction of extension has a greater surface roughness.

The hydrodynamic bearing device pertaining to the tenth invention is the hydrodynamic bearing device pertaining to the sixth invention, wherein the coefficient of thermal expansion of the center shaft member is greater than the coefficient of thermal expansion of the outer cylinder member.

The hydrodynamic bearing device pertaining to the eleventh invention is the hydrodynamic bearing device pertaining to the first invention, wherein the communicating path includes an axial direction communicating path that passes through from the end surface of the sleeve at one end toward the end surface at the other end in the axial direction, and a radial direction communicating path that is formed in a gap between the cover member and the end surface of the sleeve at one end, and passes through in the radial direction between the bearing hole and the radial direction communicating path. The capillary force to which the adhesive is subjected is greater at the both ends in the circumferential direction of the radial direction communicating path than at the both ends of the axial direction communicating path in the circumferential direction.

The hydrodynamic bearing device pertaining to the twelfth invention is the hydrodynamic bearing device pertaining to the first invention, wherein the communicating path includes an axial direction communicating path that passes through from the end surface of the sleeve at one end toward the end surface at the other end in the axial direction, and a radial direction communicating path that is formed in a gap between the cover member and the end surface of the sleeve at one end, and passes through in the radial direction between the bearing hole and the axial direction communicating path. The equivalent diameter Da of an axial direction cross section of the axial direction communicating path is greater than the equivalent diameter Dr of a radial direction cross section of the radial direction communicating path, and the circumferential length La of an axial direction cross section of the axial direction communicating path is less than the circumferential length Lr of a radial direction cross section of the radial direction communicating path. The equivalent diameter Da and the equivalent diameter Dr are four times the respective quotients obtained by dividing the axial direction cross sectional area Aa of the axial direction communicating path and the radial direction cross sectional area Ar of the radial direction communicating path by the circumferential length La of an axial direction cross section of the axial direction communicating path and the circumferential length Lr of a radial direction cross section of the radial direction communicating path, and are expressed by the following Relational Formula 1.

[First Mathematical Formula]

$$Da = 4\frac{Aa}{La}, Dr = 4\frac{Ar}{Lr} \qquad (1)$$

The hydrodynamic bearing device pertaining to the thirteenth invention is the hydrodynamic bearing device pertaining to the sixth invention, wherein the communicating path includes an axial direction communicating path that is formed in a gap between the center shaft member and the outer cylinder member end surface and passes through from one end in the axial direction toward the other end in the axial direction, and a radial direction communicating path that is formed in a gap between the center shaft member and the outer cylinder member end surface and passes through in the radial direction between the bearing hole and the axial direction communicating path. The capillary force to which the adhesive is subjected is greater at the both ends in the circumferential direction of the radial direction communicating path than at the axial direction communicating path.

The hydrodynamic bearing device pertaining to the fourteenth invention is the hydrodynamic bearing device pertaining to the sixth invention, wherein the communicating path includes an axial direction communicating path that is formed in a gap between the center shaft member and the outer cylinder member and passes through from one end in the axial direction toward the other end in the axial direction, and a radial direction communicating path that is formed in a gap between the center shaft member and the outer cylinder member end surface and passes through in the radial direction between the bearing hole and the axial direction communicating path. The equivalent diameter Da of an axial direction cross section of the axial direction communicating path is greater than the equivalent diameter Dr of a radial direction cross section of the radial direction communicating path, and the circumferential length La of an axial direction cross section of the axial direction communicating path is less than the circumferential length Lr of a radial direction cross section of the radial direction communicating path. The equivalent diameter Da and the equivalent diameter Dr are four times the respective quotients obtained by dividing the axial direction cross sectional area Aa of the axial direction communicating path and the radial direction cross sectional area Ar of the radial direction communicating path by the circumferential length La of an axial direction cross section of the axial direction communicating path and the circumferential length Lr of a radial direction cross section of the radial direction communicating path, and are expressed by the following Relational Formula 1.

[First Mathematical Formula]

$$Da = 4\frac{Aa}{La}, Dr = 4\frac{Ar}{Lr} \qquad (1)$$

The hydrodynamic bearing device pertaining to the fifteenth invention is the hydrodynamic bearing device pertaining to any of the eleventh to fourteenth invention, wherein the opening angle, with respect to the center axis of the sleeve, of the two line segments formed by respectively linking the center axis and the both ends in the circumferential direction of the axial direction communicating path when viewed in the axial direction is smaller than the opening angle, with respect to the center axis of the sleeve, of the two line segments formed by respectively linking the center axis and the both ends in the circumferential direction of the radial direction communicating path when viewed in the axial direction.

The hydrodynamic bearing device pertaining to the sixteenth invention is the hydrodynamic bearing device pertaining to any of the eleventh to fourteenth invention, wherein the two line segments formed by respectively linking the center axis of the sleeve and the both ends in the circumferential direction of the axial direction communicating path when viewed in the axial direction are within a range bounded by the two line segments defined by respectively linking the center axis and the both ends in the circumferential direction of the radial direction communicating path when viewed in the axial direction.

The hydrodynamic bearing device pertaining to the seventeenth invention is the hydrodynamic bearing device pertaining to the second or seventh invention, wherein the radial direction communicating path has a shape of its both ends in the circumferential direction that forms an acute angle when viewed in the radial direction.

The hydrodynamic bearing device pertaining to the eighteenth invention is the hydrodynamic bearing device pertaining to the seventeenth invention, wherein the angle formed by the both ends in the circumferential direction of the radial direction communicating path when viewed in the radial direction is at least 2 degrees and no more than 60 degrees.

The hydrodynamic bearing device pertaining to the nineteenth invention is the hydrodynamic bearing device pertaining to the eleventh or twelfth invention, further comprising an adhesive reservoir groove that is provided on the end surface at one end of the sleeve, between the axial direction communicating path and the circumferential direction end of the radial direction communicating path, so as to intersect a line segment linking the center of the figure in the axial direction cross section of the radial direction communicating path, and the circumferential direction end of the radial direction communicating path.

The hydrodynamic bearing device pertaining to the twentieth invention is the hydrodynamic bearing device pertaining to the thirteenth or fourteenth invention, further comprising an adhesive reservoir groove that is provided on the end surface at one end of the outer cylinder member, between the axial direction communicating path and the circumferential direction end of the radial direction communicating path, so as to intersect a line segment linking the center of the figure in the axial direction cross section of the axial direction communicating path and the circumferential direction end of the radial direction communicating path.

The spindle motor pertaining to the twenty-first invention is equipped with the hydrodynamic bearing device pertaining to the first or sixth inventions.

The information apparatus pertaining to the twenty-second invention is equipped with the spindle motor pertaining to the twenty-first invention.

EFFECTS OF THE INVENTION

With the present invention, good communication is obtained in the center part of the communicating path, there are no places of insufficient adhesive between bonded members, sufficient adhesive strength is maintained immediately after assembly, and from a long-term standpoint of subjecting the product to a heat cycle, heat shock, or the like, the lubricant does not seep in between the adhesive and the bonded members so that it would not break the bond nor lead to diminished adhesive strength, so it is possible to avoid the lack of lubricating fluid in the hydrodynamic bearing component that would otherwise be caused by this.

DETAILED DESCRIPTION OF THE INVENTION

Embodiments of the hydrodynamic bearing device of the present invention will now be described in detail along with the drawings.

Embodiment 1

Figure 1:
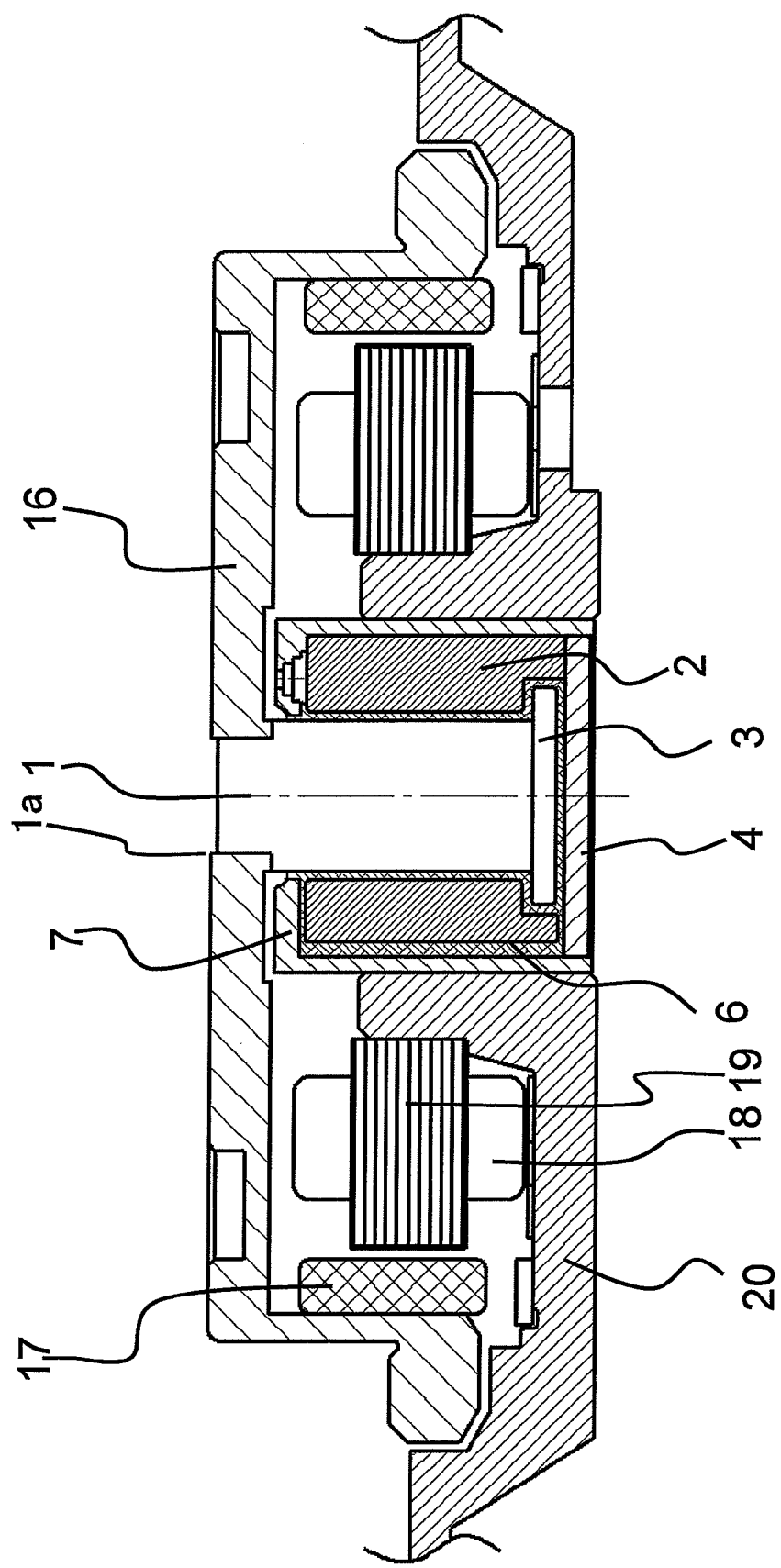
FIG. 1 is a cross section of a spindle motor equipped with the hydrodynamic bearing device of Embodiment 1.
Figure 2:
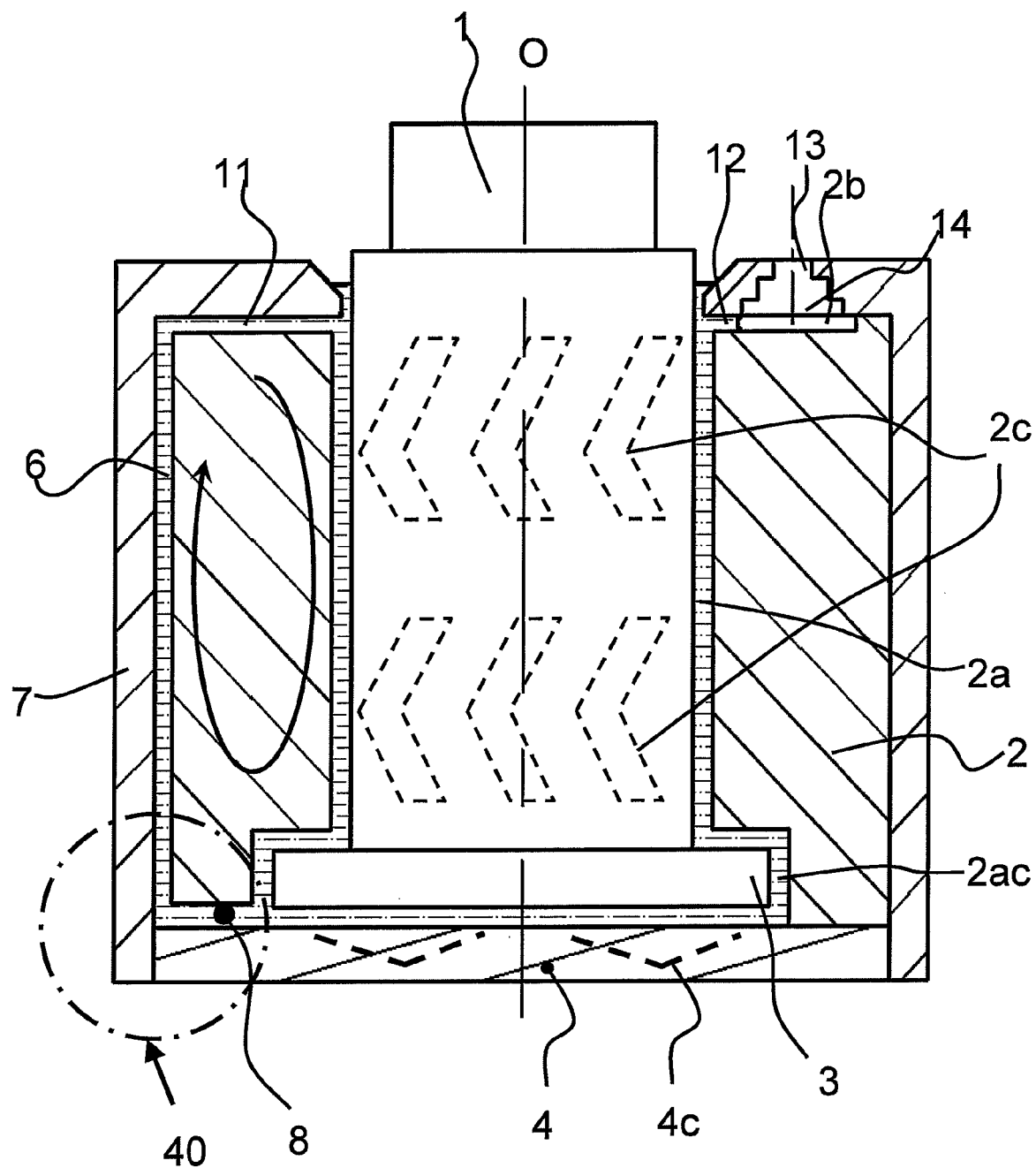
FIG. 2 is a cross section of the hydrodynamic bearing device in Embodiment 1.

FIG. 1 is a cross section of a spindle motor for a hard disk drive equipped with the hydrodynamic bearing device of the first embodiment of the present invention. FIG. 2 is a cross section of this hydrodynamic bearing device. In the following description, for the sake of convenience, we will describe a state in which the open end of a bearing hole 2a of a sleeve 2 is disposed upward and the closed end downward, as shown in FIGS. 1 and 2, but when the device is actually being used it is not limited to this orientation.

The hydrodynamic bearing device installed in this spindle motor has a cylindrical shaft 1 inserted, in a state of being relatively rotatable via a specific gap (space), in the cylindrical sleeve 2 having the bearing hole 2a, which has a circular open end on the upper side that is open and a closed end on the lower side that is closed.

A large-diameter thrust flange 3 in the form of a disk is fixed to the lower end of the shaft 1 by being fitted and linked, screwed in place, welded, etc. This large-diameter thrust flange 3 is disposed in a large-diameter hole 2ac with a circular stepped shape and that is on the closed end side of the bearing hole 2a, via a gap in the axial direction with respect to the upper face of this large-diameter hole 2ac. The disk-shaped thrust plate 4 is fixed to the bottom of the sleeve 2 so as to be opposite the lower surface of the thrust flange 3. Thus, the shaft 1 and the thrust flange 3 are supported in a state of being capable of rotation relative to the sleeve 2 and the thrust plate 4.

Further, a cover member 7 is provided in the form of a topped cylinder, which covers the outer peripheral side surface and the upper end surface 2b (the end surface on the open end side) of the sleeve 2, and has a vent hole 13 that leads to the outside for bubble discharge. One axial direction communicating path 6 extending parallel to the axial center O is formed on the outer peripheral side surface of the sleeve 2 in this hydrodynamic bearing device. This axial direction communicating path 6 is, for example, a vertical groove with a roughly arc-shape, a D-cut shape, or the like and having a surface area that is equivalent to a circular communicating hole with a diameter of about 0.2 to 0.6 mm, and is formed so that the cross sectional area (in other words, the interval between adjacent wall faces) gradually decreases moving from the center toward the both ends in the circumferential direction.

This axial direction communicating path 6 allows the large-diameter hole 2ac provided on the closed end side of the bearing hole 2a (the space region on the closed end surface side) to communicate with an upper end surface 2b, which is the end surface of the sleeve 2 on the open end side.

Also, the space between the cover member 7 and the sleeve 2, and the spaces in the interior of the sleeve 2 (that is, the space between the outer peripheral surface of the shaft 1 and the inner peripheral surface of the sleeve 2, the space inside the large-diameter hole 2ac of the bearing hole 2a, the space at the site of communication between the axial direction communicating path 6 and the large-diameter hole 2ac of the bearing hole 2a, the space inside the axial direction communicating path 6, and the space between the cover member 7 and the upper end surface 2b of the sleeve 2 (excluding the vent hole 13)) are filled with lubricant. The lubricant can be an ester-based oil, a fluorine-based oil, a high-fluidity grease, an ionic fluid, or the like.

Also, a one- or two-step radial hydrodynamic groove 2c is formed in a herringbone or spiral pattern in the inner peripheral surface of the sleeve 2. The radial hydrodynamic groove may also be provided to the cylindrical side surface around the outside of the shaft 1. When the shaft 1 and the sleeve 2 are rotated relative to one another by the rotational drive force produced by the motor, the lubricant generates hydrodynamic pressure in the radial hydrodynamic groove 2c, thus constituting a radial hydrodynamic bearing in which the shaft 1 and the sleeve 2 are supported rotatably in the radial direction.

A thrust hydrodynamic groove 4c is formed in a spiral or herringbone pattern on the upper surface of the thrust plate 4, constituting a thrust bearing. When the rotational drive force of the motor causes the thrust plate 4 and the thrust flange 3, which is attached to the shaft 1, to rotate relatively to one another, the lubricant generates hydrodynamic pressure in the thrust hydrodynamic groove 4c, thus constituting a thrust hydrodynamic bearing in which the shaft 1 and the sleeve 2 are supported rotatably in the thrust direction (axial direction). The thrust hydrodynamic groove may also be provided to the lower surface of the thrust flange 3, or in the gap between the lower surface of the sleeve 2 and the upper surface of the thrust flange 3.

As shown in FIG. 1, a substantially inverted cup-shaped hub 16, serving as the rotating member (for example, a magnetic recording disk is fixed around the peripheral side), is fixed by press fitting, adhesive bonding, welding, or another such means to a cylindrical protruding shaft 1a on the shaft 1. A rotor magnet 17 is attached inside the cylindrical hanging-down wall portion on the outer periphery of the hub 16. Also, a stator core 19 around which a stator coil 18 is wound is attached to a base 20 so as to be opposite the rotor magnet 17 and in a state of being a specific gap away from the rotor magnet 17. The rotor magnet 17 and the stator core 19 constitute the rotational drive component of a spindle motor that imparts rotational drive force between the shaft 1 and the sleeve 2.

In the above constitution, when the rotational drive force from the spindle motor causes the shaft 1 and the sleeve 2 to rotate relatively to one another, the hydrodynamic pressure generated by the radial hydrodynamic bearing portion and the thrust hydrodynamic bearing portion causes the shaft 1 to be supported and rotated in a state of maintaining a specific gap away from the sleeve 2. Here, as shown in FIG. 2, the radial hydrodynamic bearing has an asymmetrical radial hydrodynamic groove 2c so that the lubricant is sent toward the closed end side. Consequently, the lubricant between the shaft 1 and the sleeve 2 is sent toward the closed end side. Furthermore, the lubricant passes through the space between the thrust flange 3 and the sleeve 2, a radial direction communicating path 8 between the sleeve 2 and the thrust plate 4, the space inside the axial direction communicating path 6, and an introduction gap portion 11 and a bearing hole outer periphery minimum gap portion 12, in that order, then flows back to the space between the shaft 1 and the sleeve 2, with the lubricant circulating between these spaces. Here, part of the lubricant introduced from the axial direction communicating path 6 into the introduction gap portion 11 also flows to a fluid reservoir space 14. After this, it flows back through the bearing hole outer periphery minimum gap portion 12 to the space between the shaft 1 and the sleeve 2.

Therefore, even if bubbles should be generated in the radial hydrodynamic groove 2c, the thrust hydrodynamic groove, etc., they will circulate along with the lubricant because of the circulation flow. When these bubbles pass from the axial direction communicating path 6 through the introduction gap portion 11, they flow into the first lower-pressure fluid reservoir space 14. When a bubble flows into the first lower-pressure fluid reservoir space 14, it swells and becomes larger, which means that it cannot reenter the higher-pressure introduction gap portion 11 or bearing hole outer periphery minimum gap portion 12. As a result, the bubble separates from the lubricant in the fluid reservoir space 14, and is discharged to the outside of the hydrodynamic bearing device through the vent hole 13.

Figure 3A:
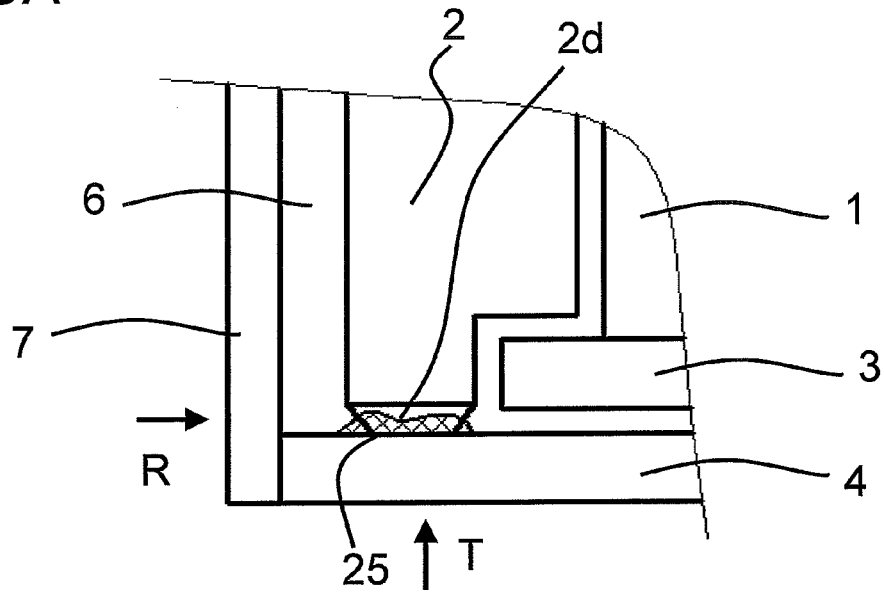
FIGS. 3A, 3B, and 3C are respectively a cross section of the part near the corner at the lower end of the sleeve of the hydrodynamic bearing device in Embodiment 1, a view of this part in the radial direction, and a view of this part in the axial direction.
Figure 3B:
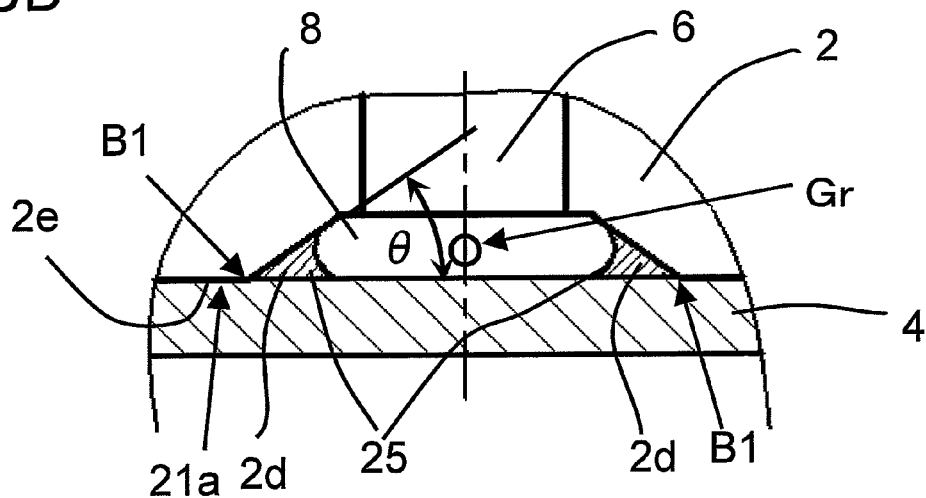
Figure 3C:
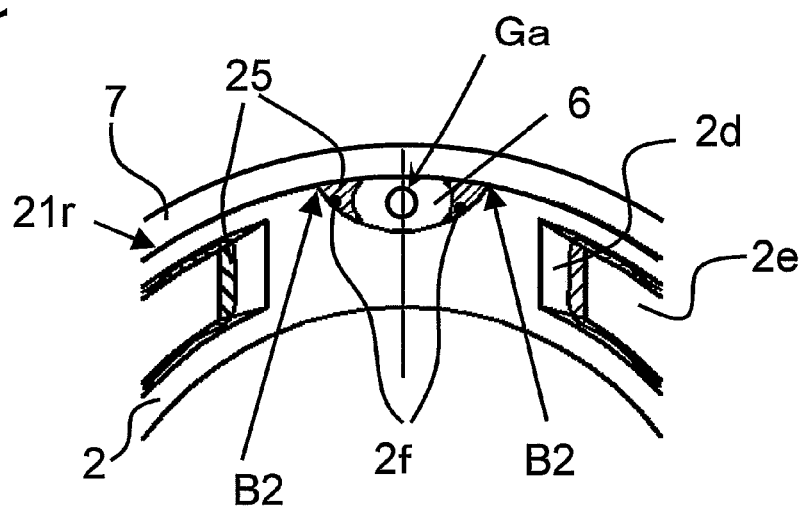

The part near the corner 40 at the lower end of the sleeve will now be described through reference to FIGS. 3A to 3C. FIG. 3A is a lateral cross section of the part near the corner 40 at the lower end of the sleeve. FIG. 3B is a view of this part near the radial direction communicating path 8 as seen from the outside in the radial direction (the R direction in FIG. 3A). FIG. 3C is a view of this part near the axial direction communicating path 6 as seen from the outside in the axial direction (the T direction in FIG. 3A). As shown in FIGS. 3A to 3C, the thrust plate 4 is in contact with a contact surface 2e provided to the lower end of the sleeve 2. An adhesive 25, such as an anaerobic adhesive or a thermosetting epoxy adhesive, is used to fix the thrust plate 4, the cover member 7, and the sleeve 2 to each other.

As shown in FIG. 3B, an adhesive inflow portion 2d is provided contiguously with the contact surface 2e so that the adhesive 25 is supported on both sides in the circumferential direction of the radial direction communicating path 8. This adhesive inflow portion 2d is flat in the circumferential direction when viewed in the direction of extension of the radial direction communicating path 8 (radial direction), and is formed in a wedge shape so that the cross sectional area (in other words, the interval between adjacent wall faces) gradually decreases moving from the cross sectional center Gr of the radial direction communicating path 8 toward the both ends B1 in the circumferential direction. In forming the radial direction communicating path 8, the end surface of the sleeve 2 is machined by stamping, forging, or the like. Alternatively, it may be formed by stamping, etc., on the end surface of the cover member 7. The radial direction communicating path 8 has a trapezoidal shape in FIG. 3B, but may instead have an arc shape or the like.

As shown in FIG. 3C, an adhesive inflow portion 2f is provided adjacent to the inner peripheral surface of the cover member 7 so that the adhesive 25 will be supported on both sides in the circumferential direction of the axial direction communicating path 6. This adhesive inflow portion 2f is flat in the circumferential direction when viewed in the direction of extension of the axial direction communicating path 6 (axial direction), and is formed in a wedge shape so that the cross sectional area (in other words, the interval between adjacent wall faces) gradually decreases moving from the cross sectional center Ga of the axial direction communicating path 6 toward the both ends B2 in the circumferential direction. In forming the axial direction communicating path 6, the outer peripheral wall surface of the sleeve 2 is machined by cutting, stamping, forging, or the like to form a square groove, a semicircle, or recess that is shallower than a semicircle. Alternatively, it may be formed by stamping, etc., on the inner peripheral surface of the cover member 7.

As discussed above, the adhesive inflow portions 2d and 2f have a wedge shape at the both ends B1 and B2. The constitution is such that prior to curing, the adhesive 25 collects at the both ends B1 and B2 due to its capillary force. Thus, after the bearing device has been completed, if the axial joint 21a between the sleeve 2 and the thrust plate 4, or the radial joint 21r between the sleeve 2 and the cover member 7 should be subjected to a heat cycle or heat shock, there will still be no decrease in adhesive strength between the components due to penetration by the lubricant. Also, because the radial joint 21r and the axial joint 21a are adequately coated with adhesive, better adhesive strength can be obtained.

Also, the adhesive 25 collects at the both ends B1 and B2 due to its capillary force, so a communicating path that allows the lubricant to circulate can be ensured near the cross sectional centers Gr and Ga.

Figure 4A:
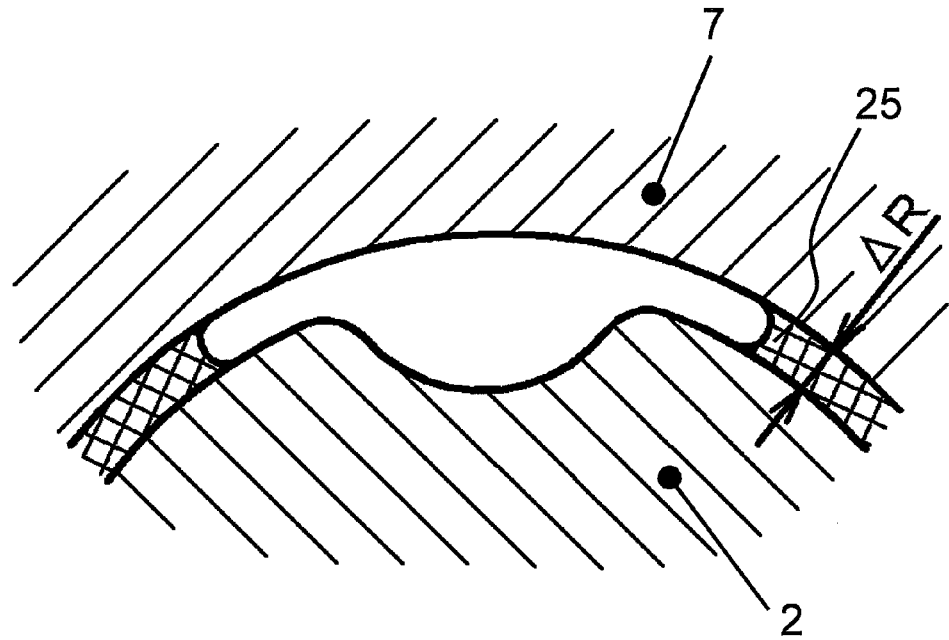
FIG. 4A is a diagram of the state just prior to the curing of the adhesive at normal temperature.
Figure 4B:
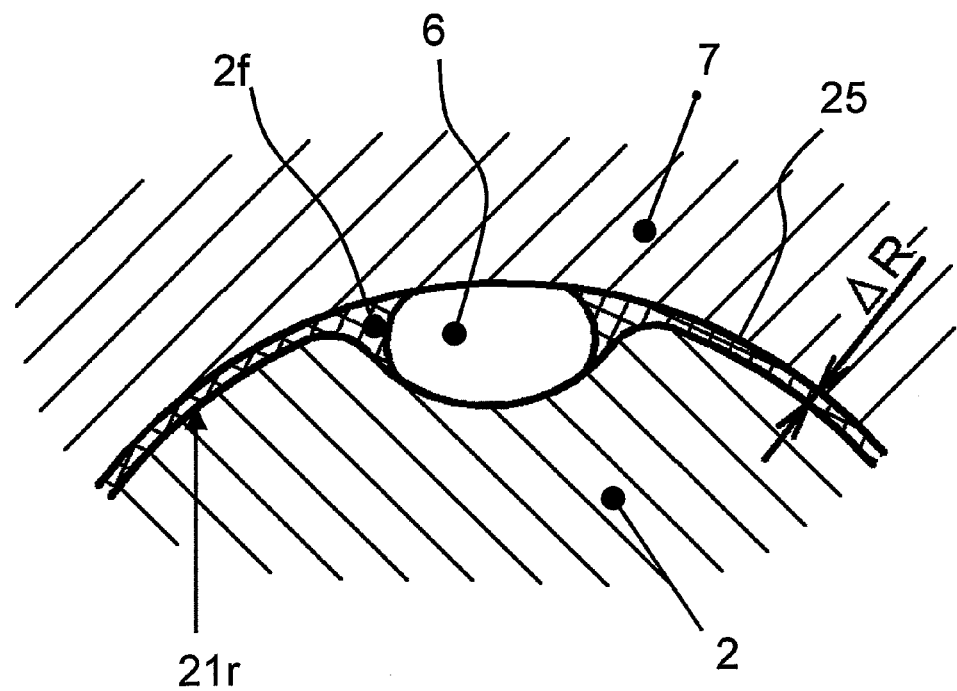
FIG. 4B is a diagram of the state during curing of the adhesive at a high temperature.

Here, if the sleeve 2 is formed from a material whose main component is a copper alloy, and if the cover member is formed from a material whose main component is an iron alloy, the coefficient of thermal expansion of the inner member (the sleeve 2) will be greater than the coefficient of thermal expansion of the outer member (the cover member 7). If the adhesive 25 here is a thermosetting type of adhesive, then when it is thermoset in a high-temperature chamber, the difference in the coefficients of thermal expansion between the two members will reduce the radial gap ΔR between the members. Therefore, in a normal-temperature state prior to curing, even if the adhesive 25 has been applied in too small an amount as shown in FIG. 4A, the adhesive 25 will go into the adhesive inflow portion 2f of the axial direction communicating path 6 as show in FIG. 4B just prior to curing in the high-temperature chamber. Thus, the lubricant can be effectively prevented from penetrating the radial joint 21r and decreasing the adhesive strength.

Figure 5A:
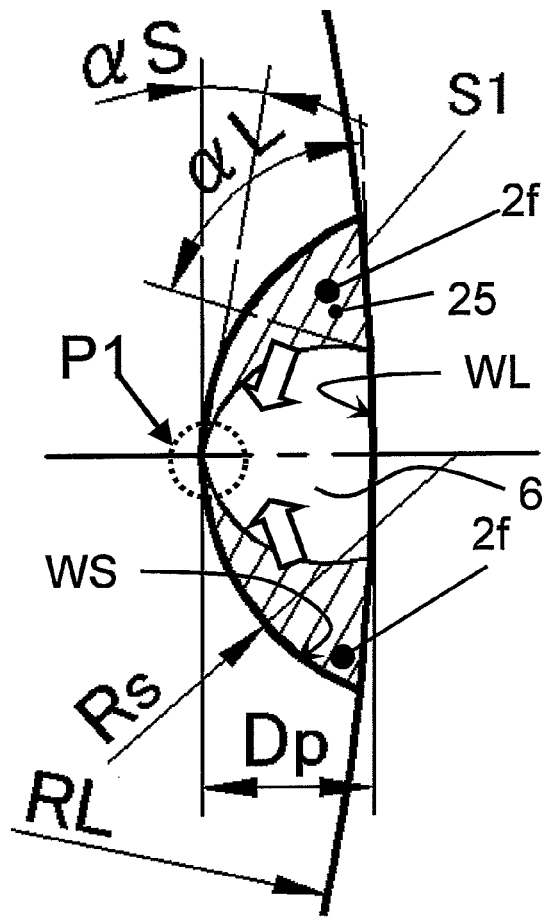
FIG. 5A is a diagram of when the contact angle of the wall face has a small radius of curvature.

As shown in FIG. 5A, the axial direction communicating path 6 is constituted by two arc-shaped wall faces WS and WL. The wall face WS here has a smaller radius of curvature RS, while the wall face WL has a larger radius of curvature RL. The radii of curvature RS, RL and the groove depth Dp of the axial direction communicating path 6 are equal respectively in FIGS. 5A and 5B.

Figure 5B:
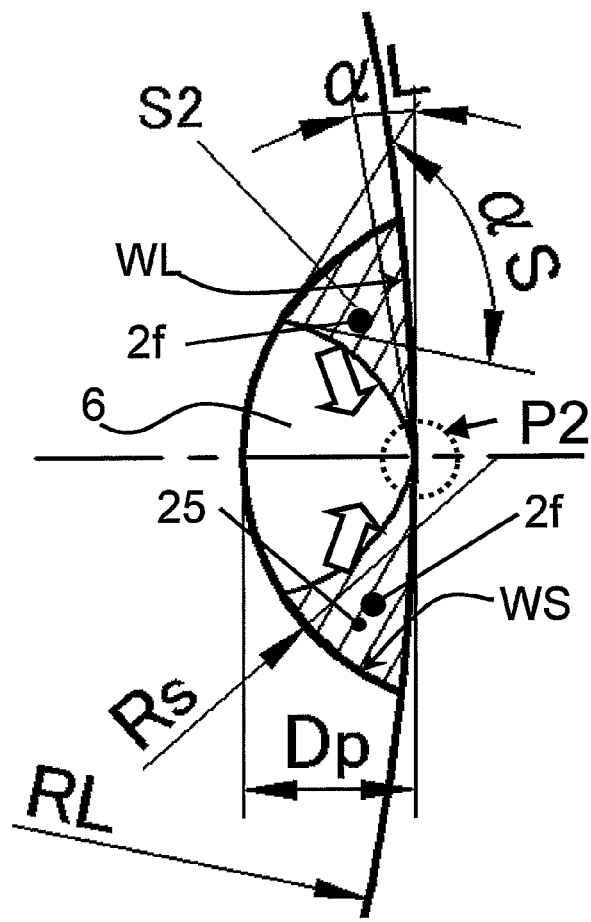
FIG. 5B is a diagram of when the contact angle of the wall face has a large radius of curvature.

Only the wettability of the wall faces WS and WL with the adhesive 25 prior to curing are mutually different in FIGS. 5A and 5B. That is, in FIG. 5A, the wall face WS is more readily wetted by the uncured adhesive 25 than is the wall face WL, and the contact angle αS of the wall face WS is less than that contact angle αL of the wall face WL. In FIG. 5B, meanwhile, the wall face WL is more readily wetted by the uncured adhesive 25 than is the wall face WS, and the contact angle αL of the wall face WL is less than that contact angle αS of the wall face WS.

FIGS. 5A and 5B here show the state at the instant the two flows of adhesive overflow from the ends of the axial direction communicating path 6 (the upper and lower ends in the drawing) and draw closer together as indicated by the white arrows in the drawings, coming into contact with each other at the points P1 and P2. In this state, we will let S1 and S2 be the area of the adhesive 25 shown as the hatched areas. A comparison of the surface areas S1 and S2 reveals that S1 is larger, although mathematical proof will not be presented here. This means that, as shown in FIG. 5A, more of the adhesive can be kept in the adhesive inflow portion 2f by making the adhesive wettability of the face with the smaller radius of curvature be better than the wettability of the face with the larger radius of curvature. Therefore, the axial direction communicating path 6 can be effectively prevented from being buried in adhesive by making the face with the smaller radius of curvature have better adhesive wettability.

Increasing surface roughness is an effective way to reduce the contact angle and improve wettability. Therefore, when the inner periphery of the cover member 7 is machined into a cylindrical shape and a vertical groove is formed around the outside of the sleeve 2 to constitute the axial direction communicating path 6, the inner peripheral surface of the cover member 7 may be machined so as to have less roughness. This increases the surface roughness of the vertical groove and allows a configuration close to that in FIG. 5A to be obtained.

Another way to accomplish this is to irradiate the outer periphery of the sleeve 2 with ultraviolet rays, ozone, or the like prior to coating with the adhesive, thereby creating a surface active state, and then quickly coating with the adhesive and assembling. The adhesive wettability can be increased in this way.

The axial direction communicating path 6 was used as an example in the above description, but it should go without saying that the same applies to the radial direction communicating path 8.

With the hydrodynamic bearing device in this embodiment, as discussed above, the adhesive inflow portion is formed such that the cross sectional shape of the communicating path when viewed in its direction of extension is flat in the circumferential direction, and the cross sectional area (in other words, the interval between adjacent wall faces) gradually decreases moving from the center of the cross section of the communicating path toward the both ends in the circumferential direction.

Consequently, good communication through the center part of the communicating path can be ensured by actively inducing the adhesive to flow to the adhesive inflow portion and be held there. Also, there are no places of insufficient adhesive between bonded members, and sufficient adhesive strength can be maintained immediately after assembly. Furthermore, from a long-term standpoint, the lubricant does not seep in between the adhesive and the bonded members even when subjected to a heat cycle or the like so that it would not break the bond nor lead to diminished adhesive strength. Also, it is possible to avoid the lack of lubricant in the hydrodynamic bearing portion that would otherwise be caused by this.

In the above embodiment, an example was described in which the cover member had an L-shaped cross section so that it covered the entire outer peripheral cylinder surface of the sleeve 2 and the entire end surface at one end of the sleeve, but the present invention is not limited to this. For instance, the cover member may be divided into a cylinder portion and a flat portion.

Embodiment 2

Figure 6:
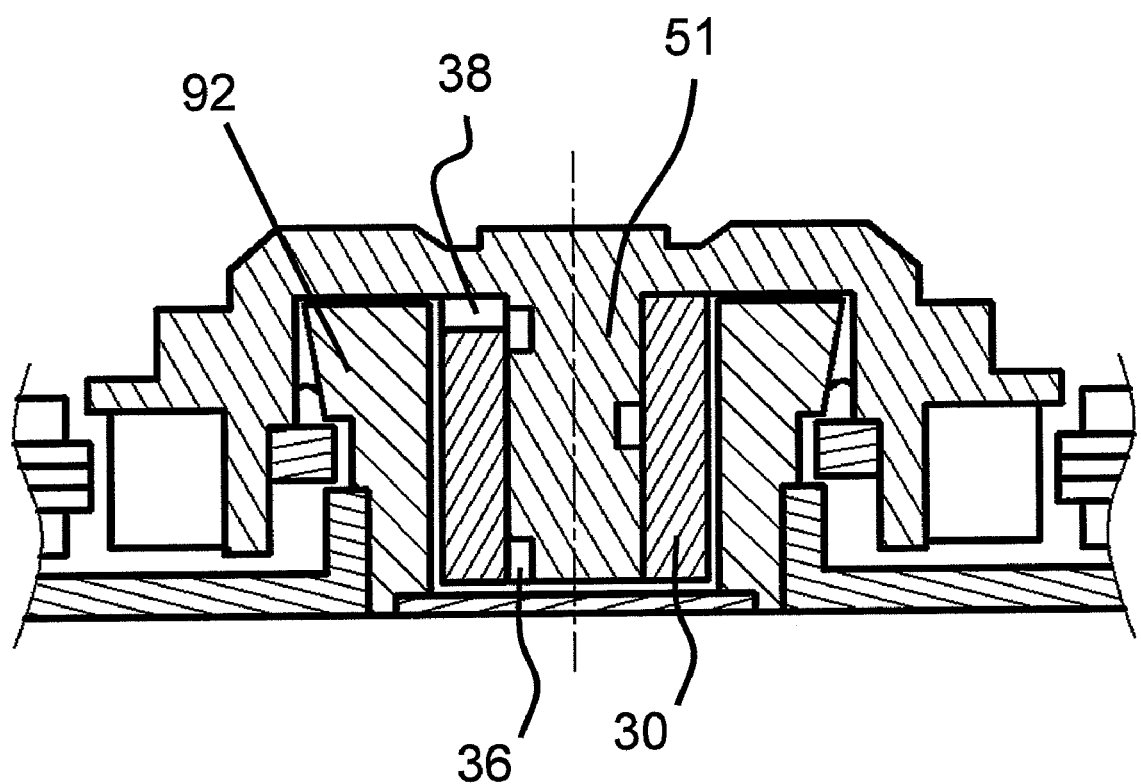
FIG. 6 is a cross section of the area around where the bearing is mounted in a spindle motor equipped with the hydrodynamic bearing device pertaining to Embodiment 2.

FIG. 6 is a cross section of the area around where the bearing device is mounted in a spindle motor equipped with the hydrodynamic bearing device pertaining to Embodiment 2 of the present invention.

Here, an outer cylinder member 30 is bonded to a shaft 51, and a radial bearing is formed in a tiny gap formed between a sleeve 92 and the outer periphery of the outer cylinder member 30. Here, a spiral axial direction communicating path 36 is formed on the outer peripheral cylinder surface of the stainless steel shaft 51. The outer cylinder member 30 is composed of zirconia, silicon carbide, alumina, or another such ceramic, and a radial direction communicating path 38 is formed at the upper end.

Again in this embodiment, just as in Embodiment 1 above, the cross sectional shape of the communicating path when viewed in its direction of extension is flat in the circumferential direction, and the cross sectional area (in other words, the interval between adjacent wall faces) gradually decreases moving from the center of the cross section of the communicating path toward the both ends in the circumferential direction. Also, the adhesive is actively induced to flow to the adhesive inflow portion and be held there.

Consequently, good communication through the center part of the communicating path can be ensured, there are no places of insufficient adhesive between bonded members, and sufficient adhesive strength can be maintained immediately after assembly. Furthermore, from a long-term standpoint, the lubricant does not seep in between the adhesive and the bonded members even when subjected to a heat cycle or the like, which would break the bond and lead to diminished adhesive strength. Also, it is possible to avoid the lack of lubricant in the hydrodynamic bearing portion that would otherwise be caused by this.

Embodiment 3

Figure 7:
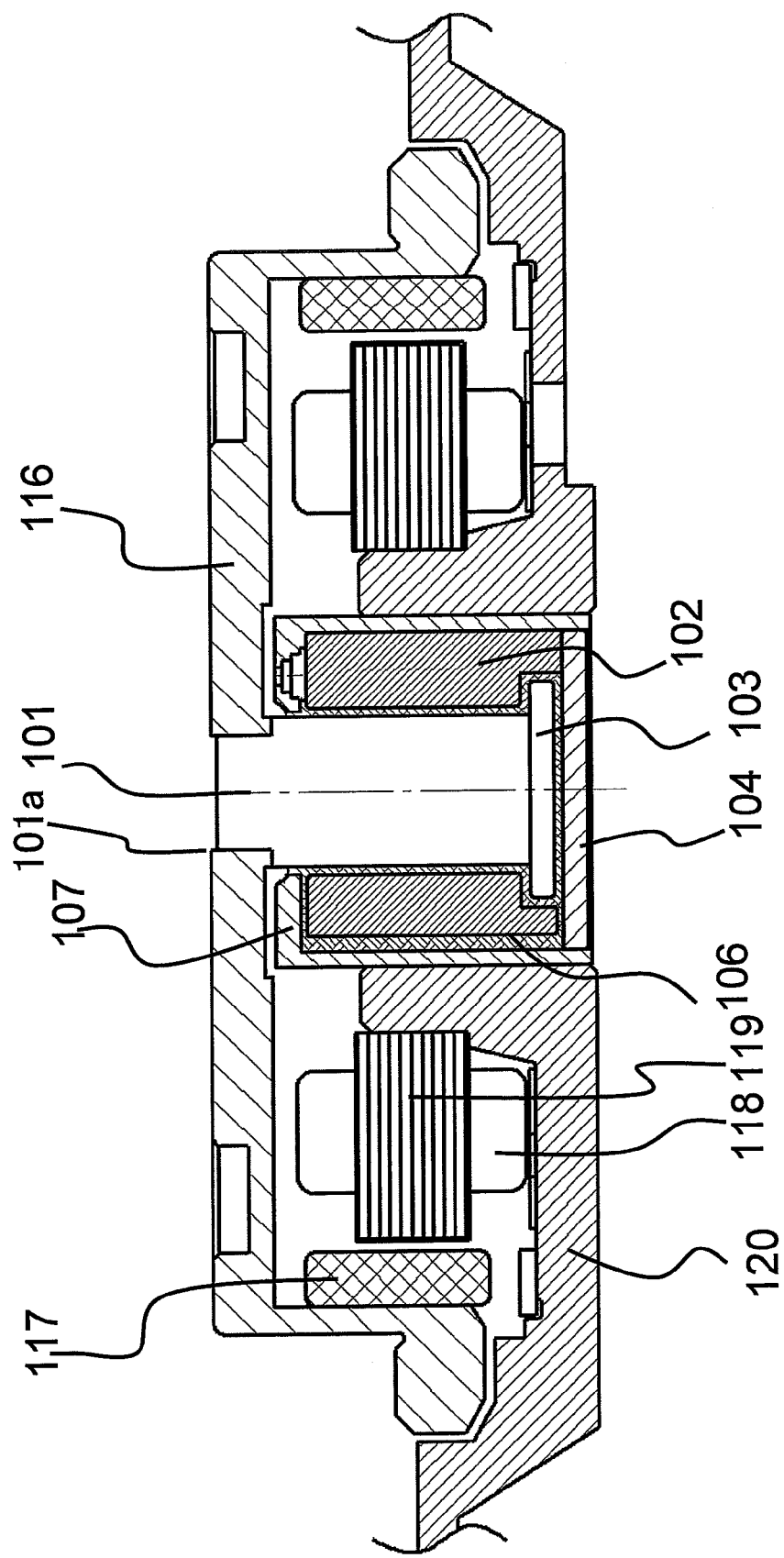
FIG. 7 is a cross section of a spindle motor equipped with the hydrodynamic bearing device in Embodiment 3.
Figure 8:
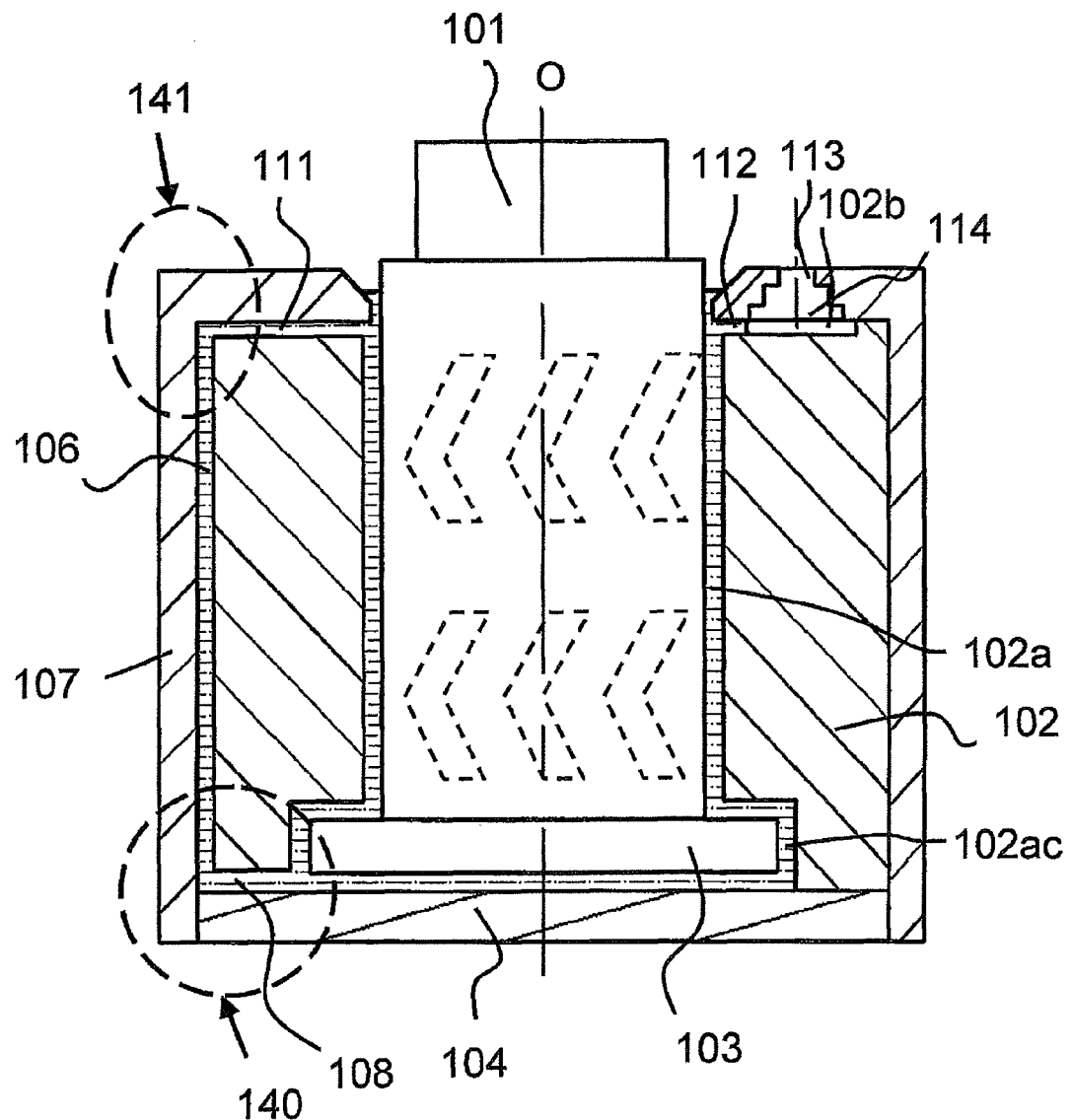
FIG. 8 is a cross section of the hydrodynamic bearing device in Embodiment 3.

FIG. 7 is a cross section of a spindle motor for a hard disk device equipped with the hydrodynamic bearing device in Embodiment 3 of the present invention, and FIG. 8 is a cross section of this hydrodynamic bearing device. The following description is of a state in which, as shown in FIGS. 7 and 8, the open end of a bearing hole 102a of a sleeve 102 happens to be disposed above, and the closed end is disposed below, but in actual usage the orientation is not limited to this.

As shown in FIG. 8, with the hydrodynamic bearing device of this spindle motor, a cylindrical shaft 101 is inserted, in a state of being rotatable via a specific gap (space), in a cylindrical sleeve 102 having a bearing hole 102a, which has a circular open end on the upper side that is open and a closed end on the lower side that is closed. A disk-shaped large-diameter thrust flange 103 is fixed to the lower end of the shaft 101 by being fitted and linked, screwed in place, welded, etc. This large-diameter thrust flange 103 is disposed in a circular, stepped, large-diameter hole 102ac on the closed end side of the bearing hole 102a via a gap in the axial direction with respect to the upper surface of this large-diameter hole 102ac. Furthermore, a disk-shaped thrust plate 104 is fixed to the bottom of the sleeve 102 so as to be opposite the lower surface of the thrust flange 103. Thus, the shaft 101 and the thrust flange 103 are supported in a state of being able to rotate relatively to the sleeve 102 and the thrust plate 104.

A topped cylindrical holder 107 is also provided, and covers the outer peripheral side surface and the upper end surface 102b (end surface on the open end side) of the sleeve 102, and has a single vent hole 113 for discharging bubbles to the outside. With this hydrodynamic bearing device, an axial direction communicating path 106 (such as a substantially arc-shaped, D-cut-shaped, or other such vertical groove of which area is equivalent to an area of a circular communicating hole with a diameter of about 0.2 to 0.6 mm) that extends parallel to the axis center O is formed on the outer peripheral side surface of the sleeve 102. This axial direction communicating path 106 allows the upper end surface 102b of the sleeve 102 (the end surface on the open end side) to communicate with a large-diameter portion 102ac (a space region on the closed end side) provided to the closed end side of the bearing hole 102a.

Also, the space between the holder 107 and the sleeve 102, and the spaces in the interior of the sleeve 102 (that is, the space between the outer peripheral surface of the shaft 101 and the inner peripheral surface of the sleeve 102, the space inside the large-diameter hole 102ac of the bearing hole 102a, the space at the site of communication between the axial direction communicating path 106 and the large-diameter hole 102ac of the bearing hole 102a, the space inside the axial direction communicating path 106, and the space between the holder 107 and the upper end surface 102b of the sleeve 102 (excluding the vent hole 113)) are filled with lubricant such as lubricating oil. The lubricant can be an ester-based oil, a fluorine-based oil, a high-fluidity grease, an ionic fluid, or the like.

Also, one or two radial hydrodynamic grooves are formed in a herringbone pattern in the inner peripheral surface of the sleeve 102 or the cylindrical side surface around the outside of the shaft 101. With the radial hydrodynamic bearing thus constituted, when the shaft 101 and the sleeve 102 are rotated relative to one another by the rotational drive force produced by the motor, the force of the lubricant generated by this hydrodynamic groove causes the shaft 101 and the sleeve 102 to be supported rotatably in the radial direction via a specific gap.

A thrust hydrodynamic groove is formed in a spiral or herringbone pattern on the upper surface of the thrust plate 104 or the lower surface of the thrust flange 103, constituting a thrust bearing. With the thrust hydrodynamic bearing thus constituted, when the rotational drive force of the motor causes the thrust plate 104 and the thrust flange 103, which is attached to the shaft 101, to rotate relatively to one another, the force of the lubricant generated in this thrust hydrodynamic groove causes the shaft 101 and the sleeve 102 to be supported rotatably in the thrust direction (axial direction) via predetermined gap. The hydrodynamic groove of the thrust flange 103 may also be provided in the gap between the lower surface of the sleeve 102 and the upper surface of the thrust flange 103.

As shown in FIG. 7, a substantially inverted cup-shaped hub 116, serving as the rotating member (for example, a magnetic recording disk is fixed around the peripheral side), is fixed by press fitting, adhesive bonding, welding, or another such means to a cylindrical protruding shaft 101a protruding from the bearing hole 102a of the sleeve 102 on the shaft 101. A rotor magnet 117 is attached inside the cylindrical hanging-down wall portion on the outer periphery of the hub 116 in this embodiment. Also, a stator core 119 around which a stator coil 118 is wound is attached to a base 120 so as to be opposite the rotor magnet 117 and in a state of being a specific gap away from the rotor magnet 117. The rotor magnet 117 and the stator core 119 constitute the rotational drive component of a spindle motor that imparts rotational drive force between the shaft 101 and the sleeve 102.

In the above constitution, when the rotational drive force from the spindle motor causes the shaft 101 and the sleeve 102 to rotate relatively to one another, the force of the lubricant generated in the hydrodynamic groove of the radial hydrodynamic bearing and force of the lubricant generated in the hydrodynamic groove of the thrust hydrodynamic bearing cause the shaft 101 to be rotationally supported in a state of maintaining a specific gap away from the sleeve 102. Here, as shown in FIG. 8, the force of the lubricant generated by the asymmetrical hydrodynamic groove on the upper side of the radial hydrodynamic bearing causes the lubricant between the shaft 101 and the sleeve 102 to be sent downward. As this happens, the lubricant passes through the space between the thrust flange 103 and the sleeve 102, a radial direction communicating path 108 between the sleeve 102 and the thrust plate 104, the space inside the axial direction communicating path 106, and an introduction gap portion 111 and a bearing hole outer periphery minimum gap portion 112, in that order, then flows back to the space between the shaft 101 and the sleeve 102, with the lubricant circulating between these spaces. Also, part of the lubricant introduced from the axial direction communicating path 106 into the introduction gap portion 111 flows to a fluid reservoir space 114, and flows back through the bearing hole outer periphery minimum gap portion 112 to the space between the shaft 101 and the sleeve 102.

Therefore, even if bubbles should be generated in the radial hydrodynamic groove, the thrust hydrodynamic groove, etc., they will circulate along with the lubricant because of the above-mentioned circulation flow, and when they pass from the axial direction communicating path 106 through the introduction gap portion 111, they flow into the lower-pressure fluid reservoir space 114. When a bubble flows into the first lower-pressure fluid reservoir space 114, it swells and becomes larger, which means that it cannot reenter the higher-pressure introduction gap portion 111 or bearing hole outer periphery minimum gap portion 112. As a result, the bubble separates from the lubricant in the fluid reservoir space 114, and is discharged to the outside of the hydrodynamic bearing device through the vent hole 113.

Figure 9A:
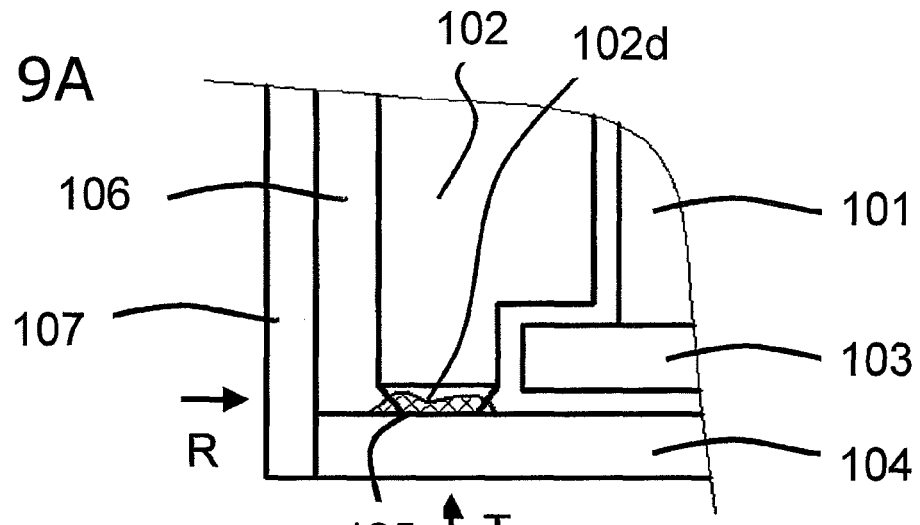
FIG. 9 consists of a cross section of the corner part at the lower end of the sleeve in the hydrodynamic bearing device of Embodiment 3, a view of this part in the radial direction, and a view of this part in the axial direction.
Figure 9B:
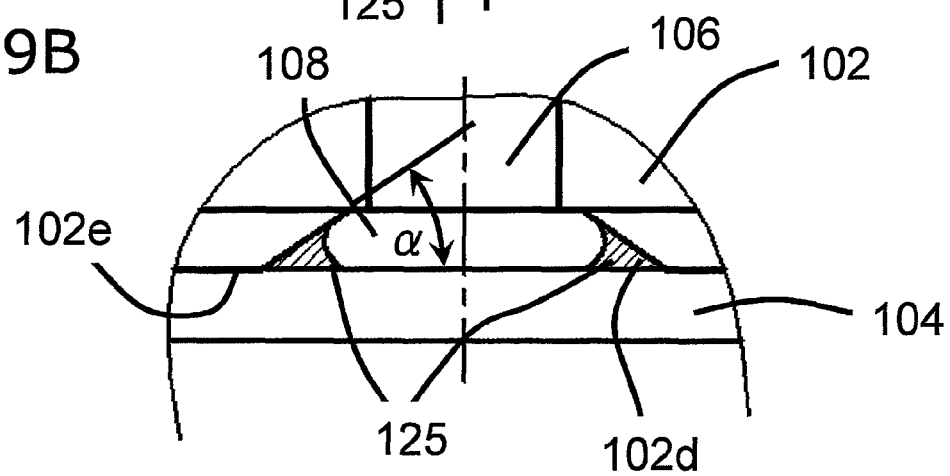
Figure 9C:
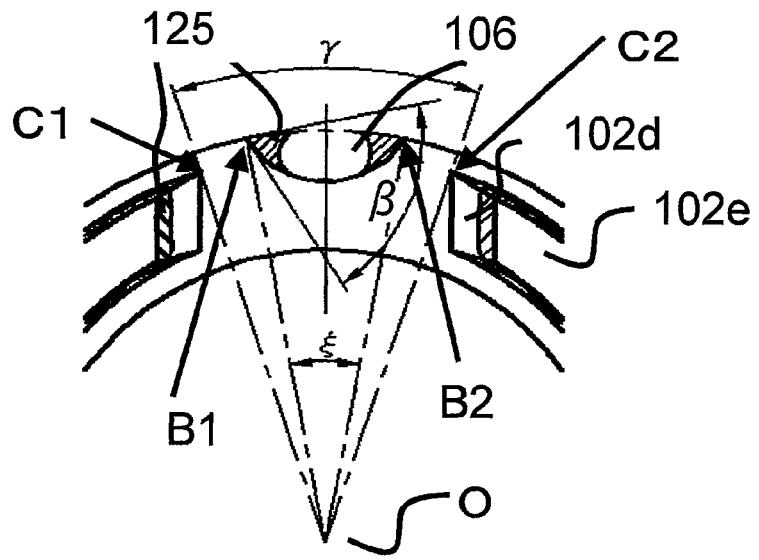

In order to make it easier to understand the cross sectional shape of the channel between the axial direction communicating path 106 and the radial direction communicating path 108, FIG. 9A shows a lateral cross section of the part near the corner 140 at the lower end of the sleeve, FIG. 9B is a view of this part near the radial direction communicating path 108 as seen from the outside in the radial direction (the R direction in FIG. 9A). FIG. 9C is a view of this part near the axial direction communicating path 106 as seen from the outside in the axial direction (the T direction in FIG. 9A). As shown in FIGS. 9A to 9C, the thrust plate 104 hits a contact surface 102e provided to the lower end of the sleeve 102. An adhesive 125 is used to fix this thrust plate.

An adhesive support portion 102d is provided contiguously with the contact surface 102e so that the adhesive 125 accumulates at a specific location within the bearing. This adhesive support portion 102d forms a narrow gap (wedge shaped in the drawing) so that the adhesive 125 will be subjected to a stronger capillary force so that the adhesive 125 will not flow anywhere it is not supposed to flow while still curing. Meanwhile, the shape of the axial direction communicating path 106 is set so that the capillary force will be smaller than in the adhesive support portion 102d so that the adhesive 125 will be less likely to accumulate. As shown in FIG. 9B, for example, the angle α formed by the adhesive support portion 102d with the contact surface 102e is an acute angle of 30 degrees or less. As shown in FIG. 9C, on the other hand, the axial direction communicating path 106 is formed such that at the portion intersecting the cylinder surface around the outside of the sleeve 102, the intersection angle β thereof is 60 degrees, for example, and the capillary force is controlled by setting these to α<β.

Figure 10A:
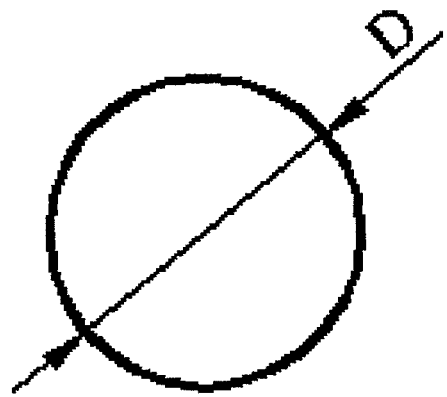
FIG. 10 is a channel cross sectional shape diagram, illustrating the concept of an equivalent diameter.
Figure 10B:
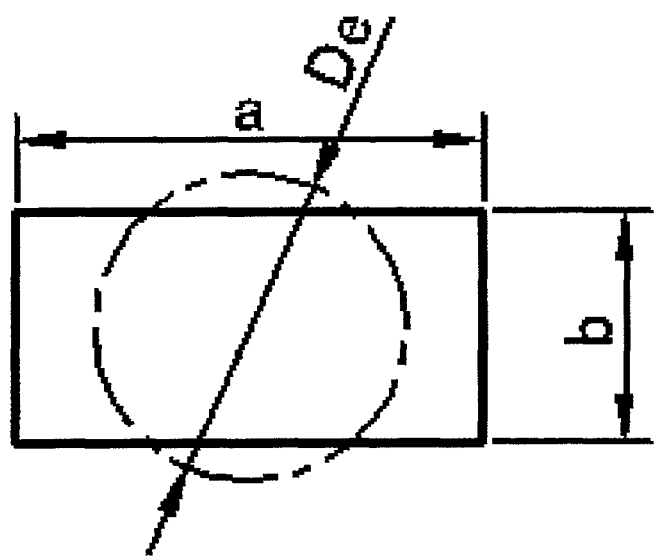
Figure 10C:
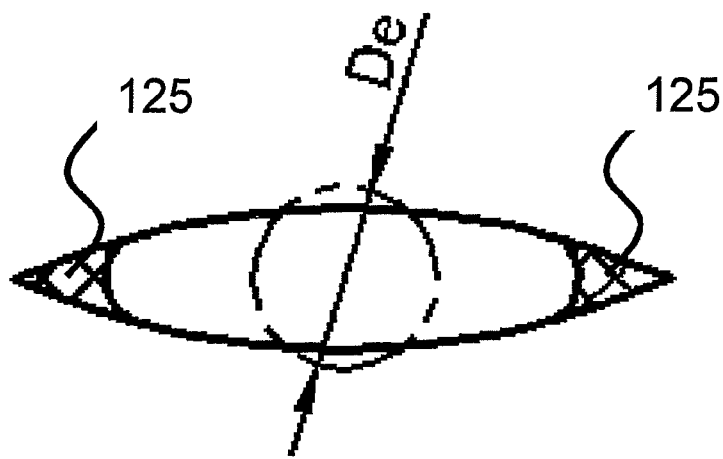

Next, we will describe the method for using the concept of equivalent diameter to adjust the capillary force in a communicating path, through reference to FIGS. 10A to 10C. An "equivalent diameter" is the diameter of a circular channel cross section when a channel having any cross sectional shape is assumed to be a channel having a circular cross section, and is expressed by the following Formula 2.

[Second Mathematical Formula]

$$De = 4\frac{A}{L} \quad (2)$$

Here, De is the equivalent diameter, A is the channel cross sectional area, and L is the circumferential length of the channel cross section. For example, as shown in FIG. 10A, with a circular cross section of diameter D, we obtain $A=\pi D^2/4$ and $L=\pi D$, so De=D.

As shown in FIG. 10B, if the cross section is a rectangle with a lateral width of a and a height of b, A=ab and L=2(a+b), so De=2ab/(a+b). Here, if a=b, then De=a.

Further, as shown in FIG. 10C, with a flattened shape in which both ends narrow to a wedge shape, even if the surface area is the same, the equivalent diameter De will be smaller than with a circular or square shape.

Thus, with a channel whose equivalent diameter De is small, the adhesive 125 tends to accumulate in the portions where the gap is narrower and wedge shaped. Furthermore, if the equivalent diameter De here is the same, the shape will be flatter when the circumferential length L is longer, so the capillary force will be stronger.

Therefore, to reduce the flow of the adhesive 125 to the axial direction communicating path 106 and keeping the radial direction communicating path 108 from becoming plugged up by the adhesive 125, it is effective to increase the capillary force of the radial direction communicating path 108 over that of the axial direction communicating path.

Specifically, the equivalent diameter Da of the axial direction communicating path 106 is made larger than the equivalent diameter Dr of the radial direction communicating path 108, and made smaller than the cross sectional circumferential length La of the axial direction communicating path 106 and the cross sectional circumferential length Lr of the radial direction communicating path 108.

Figure 11A:
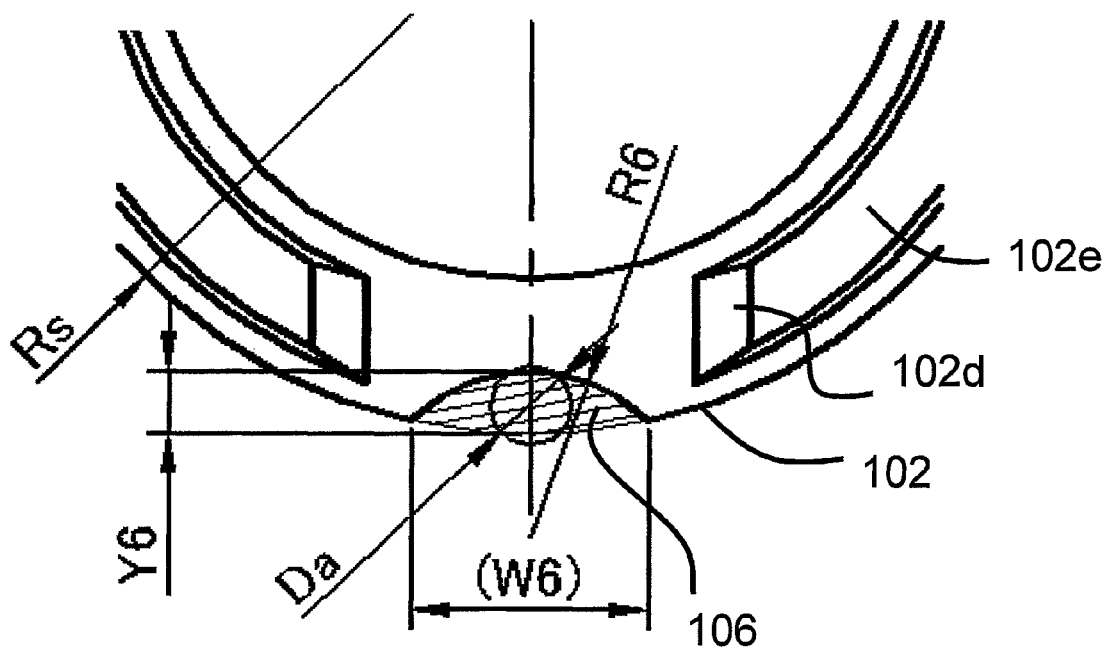
FIG. 11 consists of diagrams of the area near the communicating path in Embodiment 3, in the axial direction and the radial direction.
Figure 11B:
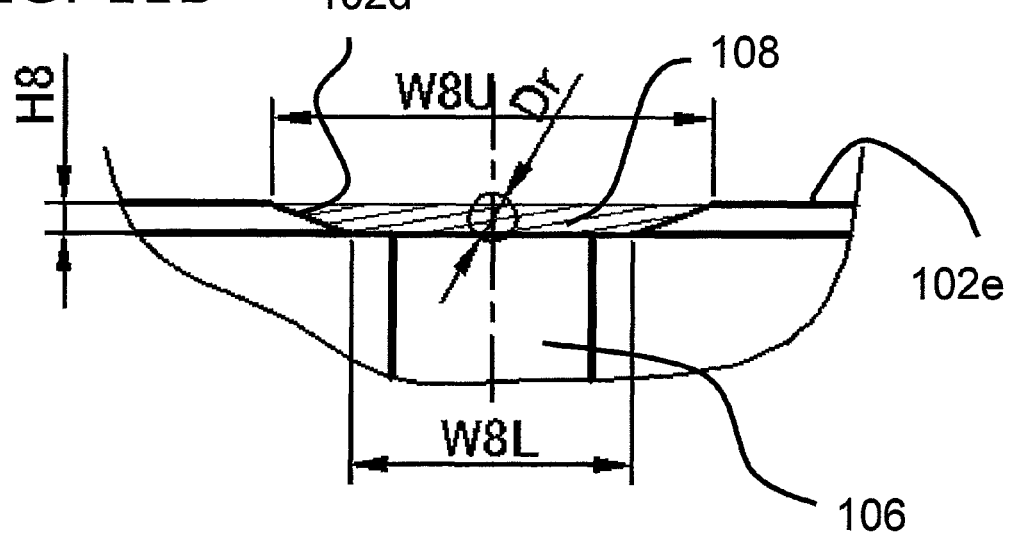

FIGS. 11a and 11b show specific examples of the shape of the communicating path in this embodiment. As shown in FIG. 11a, the arc-shaped axial direction communicating path 106 is formed around the outside of the sleeve 102. Here, for example, the radius Rs around the outside of the sleeve is 2.6 mm, the radius R6 of the arc shape is 0.8 mm, and depth Y6 of the arc from the side surface around the outside of the sleeve 102 is 0.3 mm. The equivalent diameter Da of the axial direction communicating path 106 will now be calculated. First, the channel cross sectional area Aa of the axial direction communicating path 106 is 0.2336 mm². The cross sectional circumferential length La is 2.4105 mm. Therefore, the equivalent diameter Da from Formula 2 is 0.3876 mm.

Meanwhile, as shown in FIG. 11B, for example, the radial direction communicating path 108 is trapezoidal in shape, having a lower base W8L of 1.4 mm, an upper base W8U of 2.2 mm, and a height H8 of 0.15 mm. In this case, the channel cross sectional area Ar is 0.27 mm². The cross sectional circumferential length Lr is 4.4544 mm. Therefore, the equivalent diameter Dr is 0.2425 mm.

It can be seen from the above results that since Lr>La and Da>Dr, even if an adhesive is used in the fixing of the thrust plate in FIG. 8 to the sleeve 102 and the holder 107, the adhesive will accumulate at both ends in the circumferential direction of the radial direction communicating path 108. As a result, the radial direction communicating path 108 is kept from being plugged up by the adhesive, so the hinder of the flow of lubricant through the radial direction communicating path 108 is inhibited. Also, since the capillary force is higher in the radial direction communicating path 108 than in the axial direction communicating path 106, the flow of the adhesive 125 into the axial direction communicating path 106 can be reduced, which prevents the axial direction communicating path 106 from becoming plugged as well.

FIGS. 12 to 18 illustrate Working Examples 1 to 7 as other working examples of the shape of the communicating path in this embodiment.

Figure 12A:
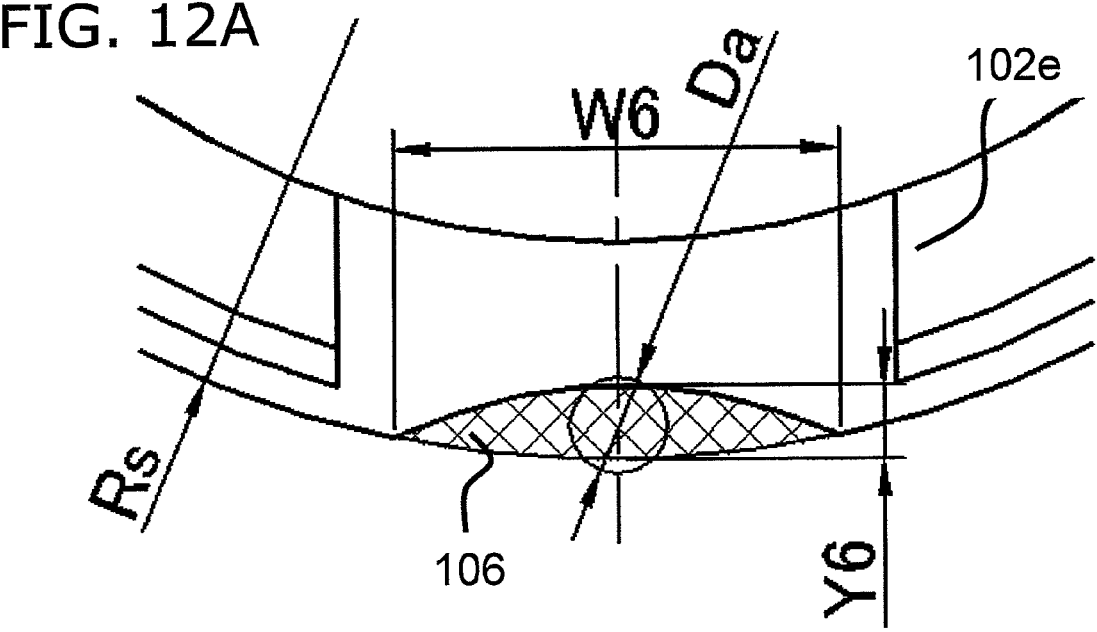
FIG. 12 consists of diagrams of the area near the communicating path in Working Example 1, in the axial direction and the radial direction.
Figure 12B:
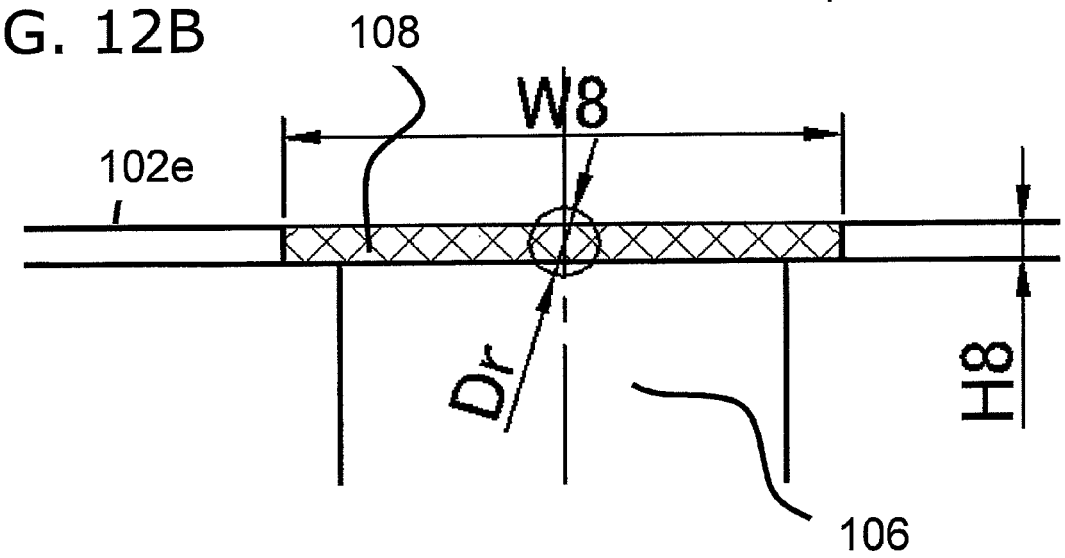

As shown in FIG. 12, in Working Example 1 the axial direction communicating path 106 and the radial direction communicating path 108 are flatter than in the specific example shown in FIG. 11.

As to the specific dimensions of the axial direction communicating path 106, for example, the outer peripheral radius Rs of the sleeve 102 is 2.85 mm, the depth Y6 of the arc from the outer peripheral side surface of the sleeve 102 is 0.2 mm, and the lateral width W6 of the axial direction communicating path 106 in the circumferential direction is 1.2 mm. The channel cross sectional area Aa of the axial direction communicating path 106 is 0.1612 mm². The cross section circumferential length La is 2.4498 mm. Therefore, the equivalent diameter Da is 0.2632 mm from Formula 2.

The radial cross sectional shape of the radial direction communicating path 108 is rectangular, and in an example of the specific dimensions thereof, the width W8 is 1.5 mm and the height H8 is 0.1 mm. The channel cross sectional area Ar here is 0.15 mm². The cross section circumferential length Lr is 3.2 mm. Therefore, the equivalent diameter Dr is 0.1875 mm.

Therefore, in Working Example 1, Da>Dr and Lr>La.

Figure 13A:
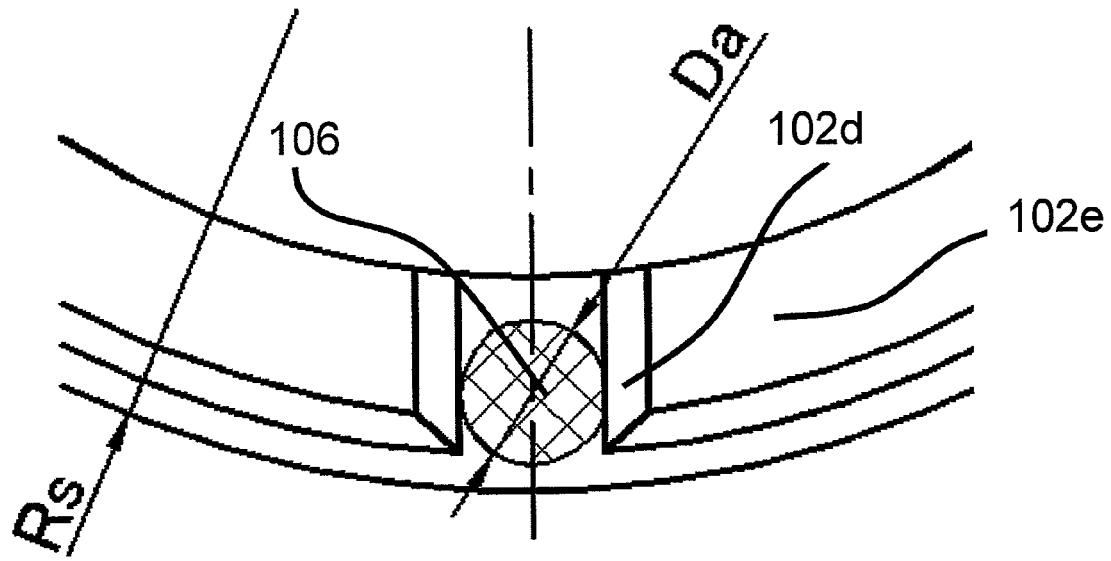
FIG. 13 consists of diagrams of the area near the communicating path in Working Example 2, in the axial direction and the radial direction.
Figure 13B:
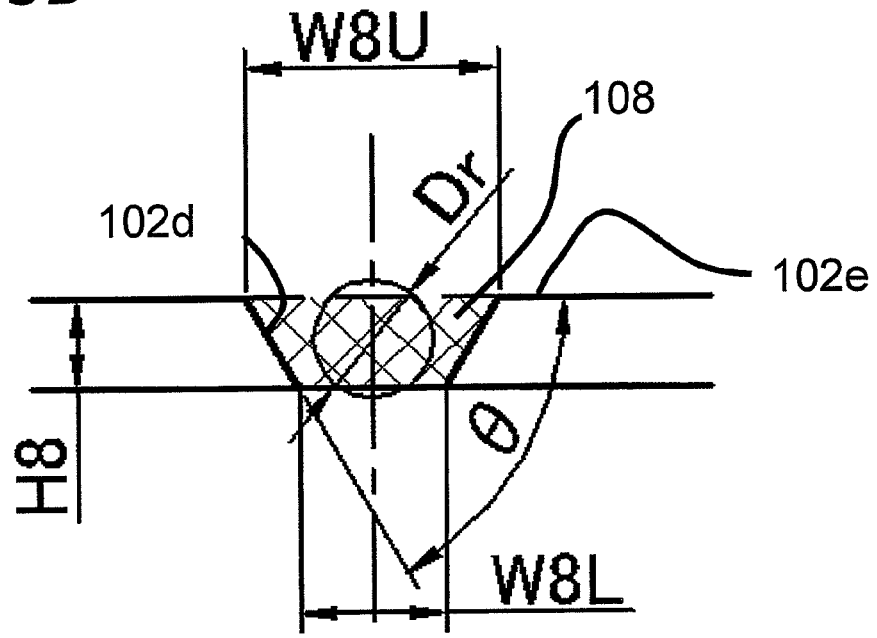

If we compare Working Example 2 shown in FIG. 13 with the specific example shown in FIG. 11, we see that neither the radial direction communicating path 108 nor the axial direction communicating path 106 is as flat as in the specific example shown in FIG. 11. Also, the axial direction communicating path 106 is not arc shaped, but rather has a simple cylindrical shape. The angle θ of the adhesive support portion 102d is 60 degrees, for example. This angle θ is preferably 60 degrees or less in order to obtain a wedge effect when the height H8 here, which is the gap in the radial direction communicating path, is 0.2 mm or greater.

The diameter of the axial direction communicating path 106 here is 0.4 mm, for example. Therefore, the channel cross sectional area Aa of the axial direction communicating path 106 is 0.1257 mm$^2$. The cross section circumferential length La is 1.2566 mm. The equivalent diameter Da is 0.4 mm from Formula 2.

The radial direction communicating path 108 is trapezoidal in shape, for example, having a lower base W8L of 0.4 mm, an upper base W8U of 0.6877 mm, and a height H8 of 0.25 mm. In this case, the channel cross sectional area Ar is 0.1361 mm$^2$. The cross sectional circumferential length Lr is 1.6660 mm. Therefore, the equivalent diameter Dr is 0.3267 mm.

Here again, Da>Dr and Lr>La.

Figure 14A:
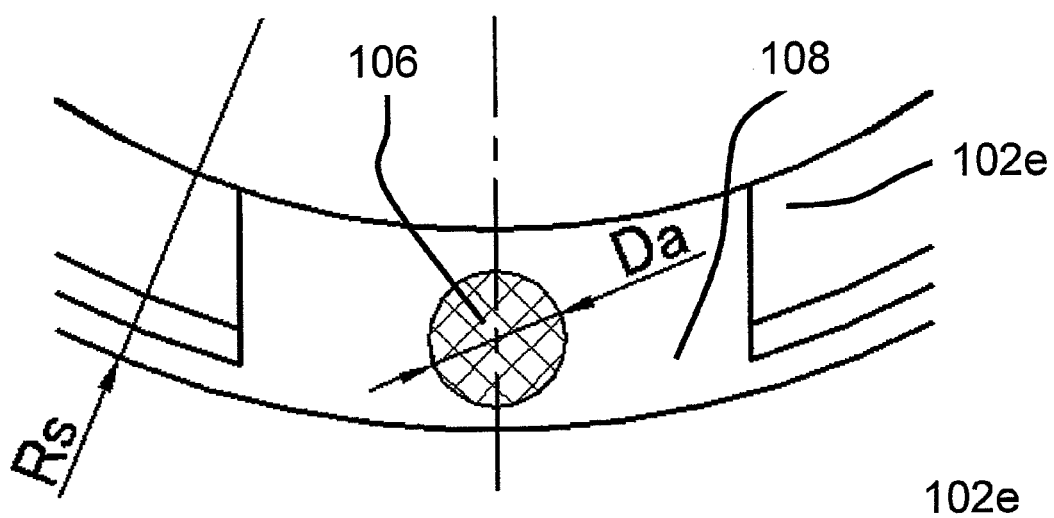
FIG. 14 consists of diagrams of the area near the communicating path in Working Example 3, in the axial direction and the radial direction.
Figure 14B:
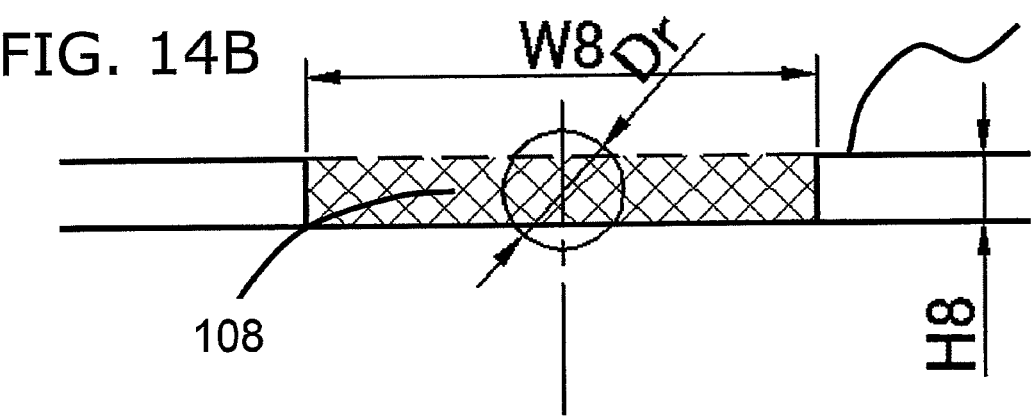

Working Example 3 shown in FIG. 14 is a further modification of Working Example 2.

Here, the axial direction communicating path 106 has a diameter of 0.4 mm, for example. Therefore, the channel cross sectional area Aa of the axial direction communicating path 106 is 0.1257 mm$^2$. The cross section circumferential length La is 1.2566 mm. The equivalent diameter Da is 0.4 mm from Formula 2.

The radial direction communicating path 108 has a radial cross sectional shape that is rectangular, and in an example of the specific dimensions thereof, the width W8 is 1.5 mm and the height H8 is 0.2 mm. The channel cross sectional area Ar here is 0.3 mm$^2$. The cross section circumferential length Lr is 3.4 mm. Therefore, the equivalent diameter Dr is 0.3529 mm.

Here again, Da>Dr and Lr>La.

Figure 15A:
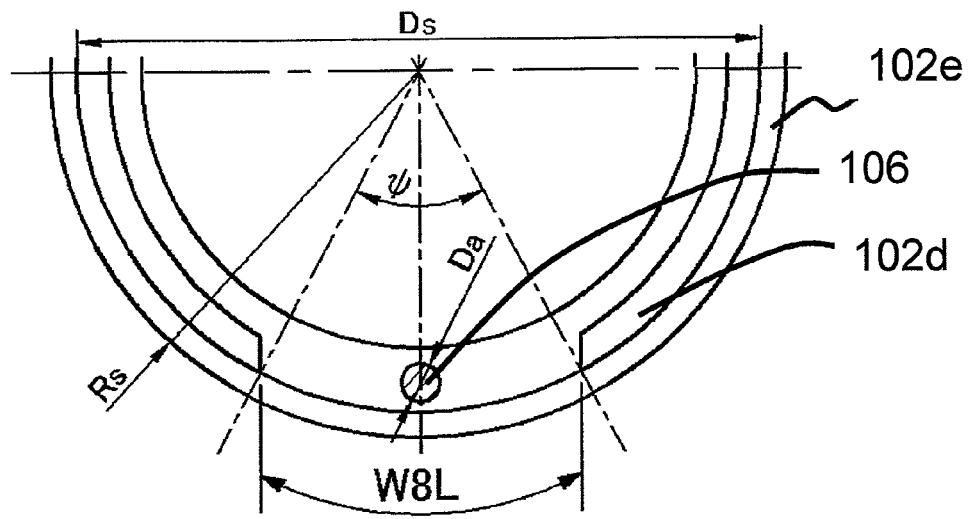
FIG. 15 consists of diagrams of the area near the communicating path in Working Example 4, in the axial direction and the radial direction and an oblique view of the sleeve.
Figure 15B:
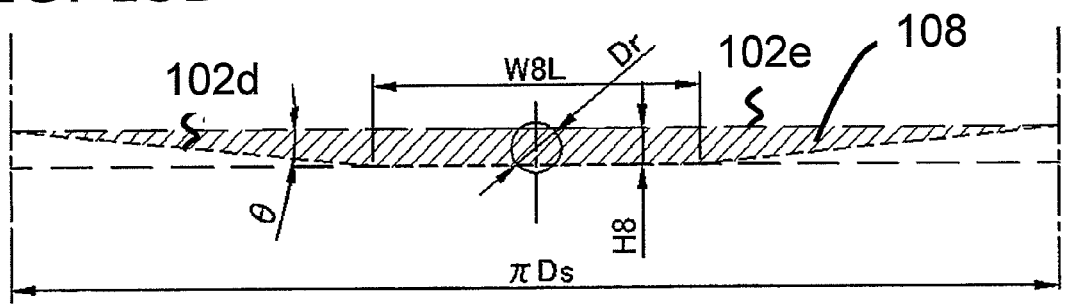
Figure 15C:
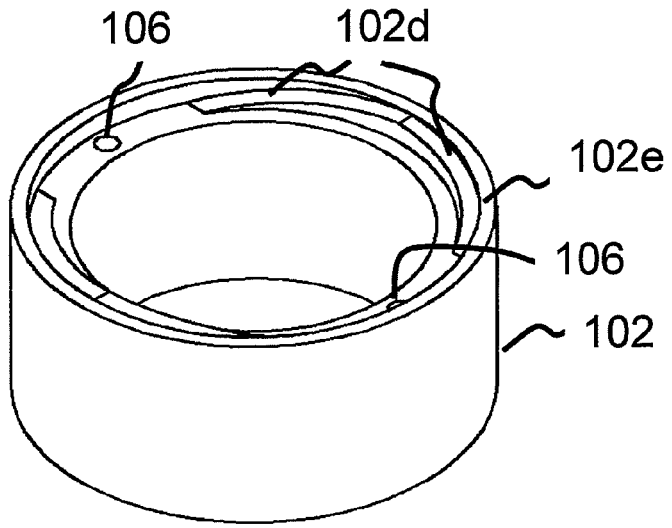

Working Example 4 shown in FIGS. 15A to 15C differs from Working Examples 1 to 3 in that, as shown in FIG. 15C, which is an oblique view of the sleeve 102, the adhesive support portion 102d spreads out upward in the drawing. The adhesive coats the contact surface 102e in order to fix the thrust plate at the contact surface. Here, in the case of Working Example 4, the angle θ of the adhesive support portion 102d is 2 degrees, for example, which strengthens the wedge effect. Also, the axial direction communicating path 106 is provided at two places on the sleeve 102.

Here, the axial direction communicating path 106 has a diameter of 0.3 mm, for example. Therefore, the channel cross sectional area Aa of the axial direction communicating path 106 is 0.0707 mm$^2$. The cross section circumferential length La is 0.9425 mm. The equivalent diameter Da is 0.3 mm from Formula 2.

The following is a specific example of the dimensions of the radial direction communicating path 108. The outside diameter Ds of the adhesive support portion 102d is 5.3 mm and the height H8 is 0.1 mm. As shown in FIG. 15A, the adhesive support portion 102d opens at an aperture angle φ around the axial direction communicating path 106, and is formed over a range of 180 degrees. If the radial direction communicating path 108 here is developed, as shown in FIG. 15B, it is trapezoidal in shape, and the length W8L of the lower base thereof is Ds*φ/2. More specifically, φ is 56 degrees and W8L is 2.5900 mm. The length of the upper base is expressed by πDs, and is 16.6504 mm.

In Working Examples 1 to 3, the evaluations were based on the shape of a projection viewed from the radial direction (cross sectional radial direction face), but when the aperture angle in the circumferential direction of the radial direction communicating path is large as in this working example (roughly 60 degrees or higher), the circumferential direction length may be used instead. Here, the channel cross sectional area Ar is 0.5462 mm$^2$. The cross section circumferential length Lr is 16.6539 mm. Therefore, the equivalent diameter Dr is 0.1312 mm.

Here again, Da>Dr and Lr>La.

Figure 16A:
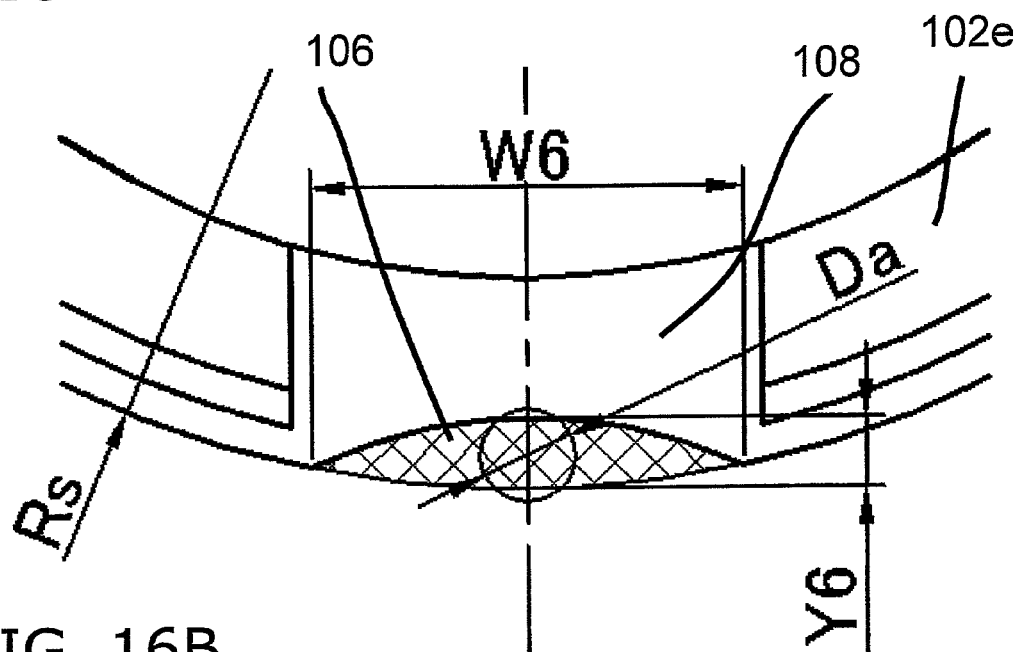
FIG. 16 consists of diagrams of the area near the communicating path in Working Example 5, in the axial direction and the radial direction.
Figure 16B:
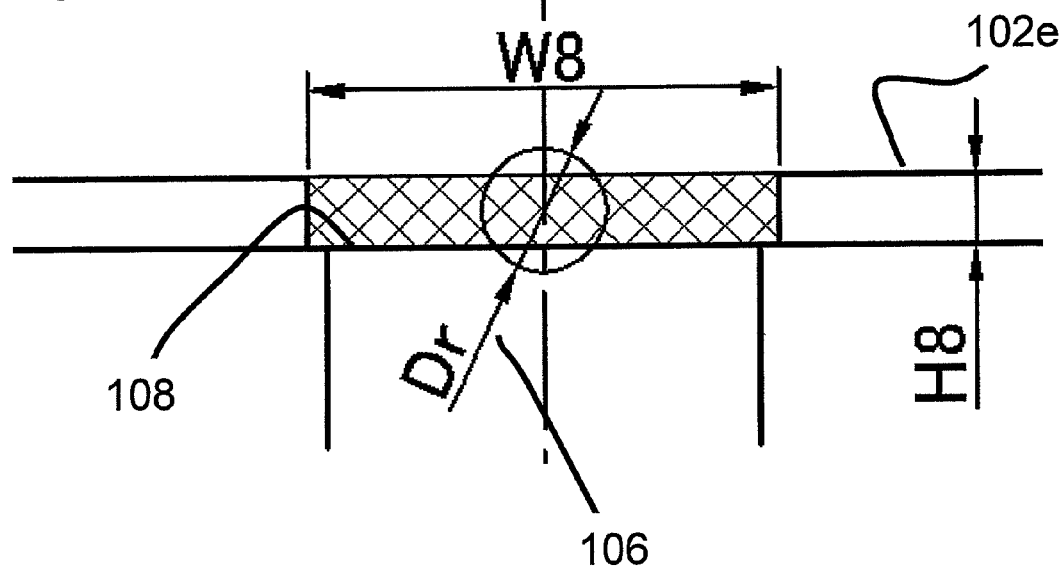

Working Example 5 shown in FIG. 16 is a modification of the radial direction communicating path in Working Example 1.

In an example of the specific dimensions of the axial direction communicating path 106, the outer peripheral radius Rs of the sleeve 102 is 2.85 mm, the depth Y6 of the arc from the outer peripheral side surface of the sleeve 102 is 0.2 mm, and the lateral width W6 of the axial direction communicating path 106 in the circumferential direction is 1.2 mm. The channel cross sectional area Aa of the axial direction communicating path 106 is 0.1612 mm$^2$. The cross section circumferential length La is 2.4498 mm. Therefore, the equivalent diameter Da is 0.2632 mm from Formula 2.

The radial cross sectional shape of the radial direction communicating path 108 is rectangular, and in an example of the specific dimensions thereof, the width W8 is 1.3 mm and the height H8 is 0.2 mm. The channel cross sectional area Ar here is 0.26 mm$^2$. The cross section circumferential length Lr is 3.0 mm. Therefore, the equivalent diameter Dr is 0.3467 mm.

Here, the equivalent diameter Dr of the radial direction communicating path 108 is greater than the equivalent diameter Da of the axial direction communicating path 106, so Dr>Da and Lr>La. As will be discussed below, in this Working Example 5 the adhesive leaks out to the axial direction communicating path 106.

Figure 17A:
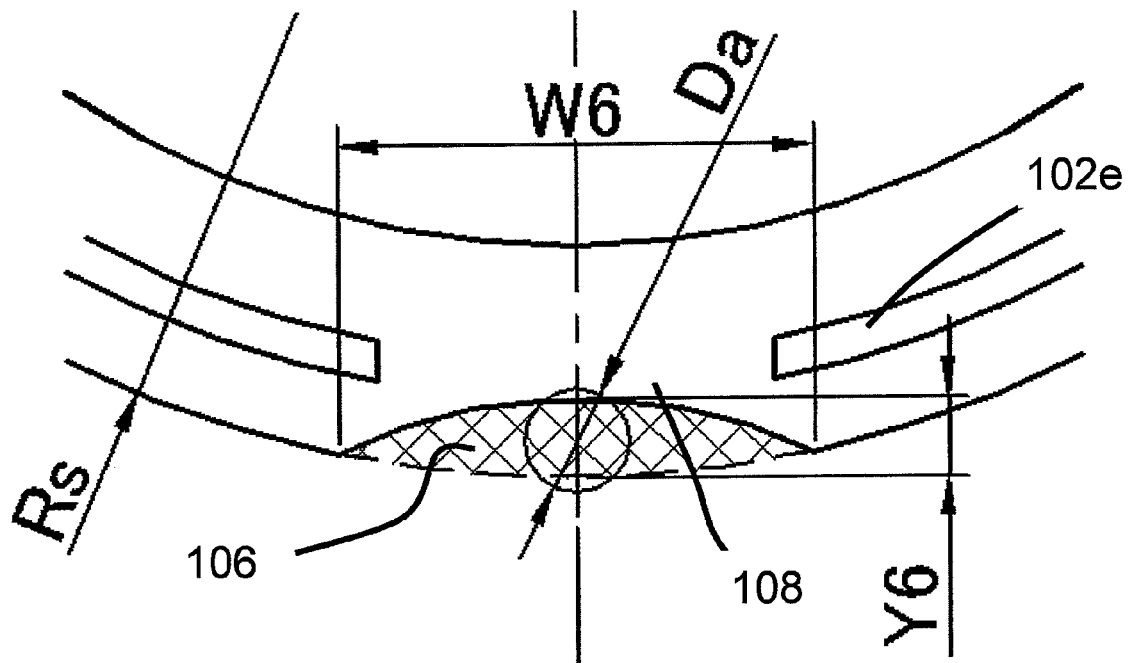
FIG. 17 consists of diagrams of the area near the communicating path in Working Example 6, in the axial direction and the radial direction.
Figure 17B:
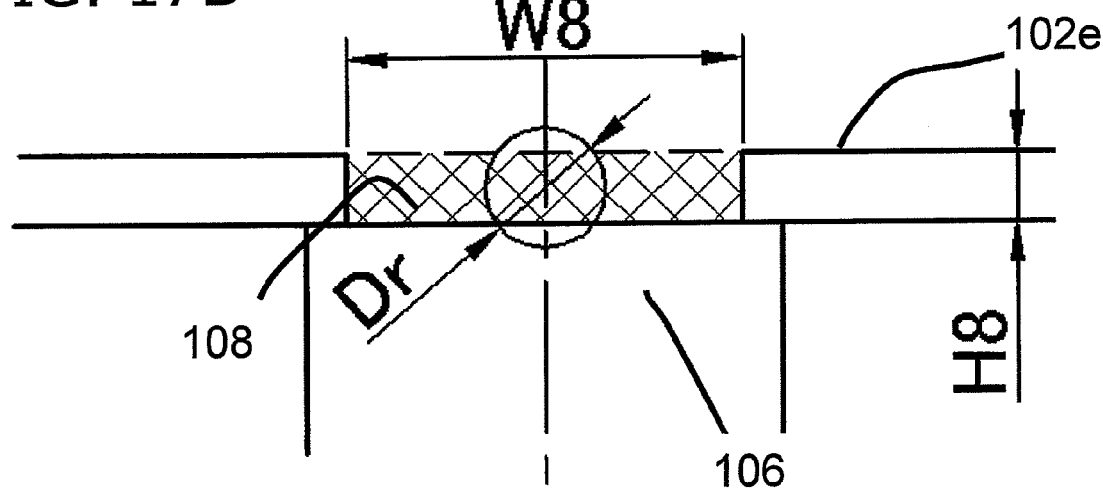

Working Example 6 shown in FIG. 17 is a modification of the radial direction communicating path in Working Example 1.

In an example of the specific dimensions of the axial direction communicating path 106, for example, the outer peripheral radius Rs of the sleeve 102 is 2.85 mm, the depth Y6 of the arc from the outer peripheral side surface of the sleeve 102 is 0.2 mm, and the lateral width W6 of the axial direction communicating path 106 in the circumferential direction is 1.2 mm. The channel cross sectional area Aa of the axial direction communicating path 106 is 0.1612 mm$^2$. The cross section circumferential length La is 2.4498 mm. Therefore, the equivalent diameter Da is 0.2632 mm from Formula 2.

The radial cross sectional shape of the radial direction communicating path 108 is rectangular, and in an example of the specific dimensions thereof, the width W8 is 1.0 mm and the height H8 is 0.18 mm. The channel cross sectional area Ar here is 0.18 mm$^2$. The cross section circumferential length Lr is 2.36 mm. Therefore, the equivalent diameter Dr is 0.3051 mm.

Here, the equivalent diameter Dr of the radial direction communicating path 108 is greater than the equivalent diameter Da of the axial direction communicating path 106, and the cross section circumferential length La of the axial direction communicating path 106 is greater than the cross section circumferential length Lr of the radial direction communicating path 108. That is, Dr>Da and Lr<La. As will be discussed below, in this Working Example 5 the adhesive leaks out to the axial direction communicating path 106.

Figure 18A:
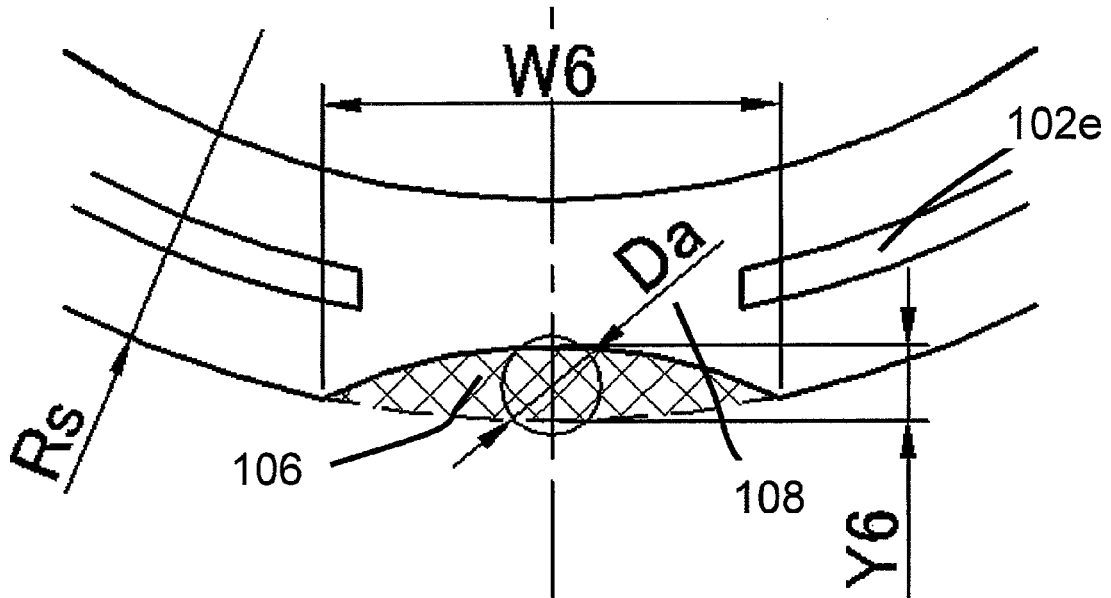
FIG. 18 consists of diagrams of the area near the communicating path in Working Example 7, in the axial direction and the radial direction.
Figure 18B:
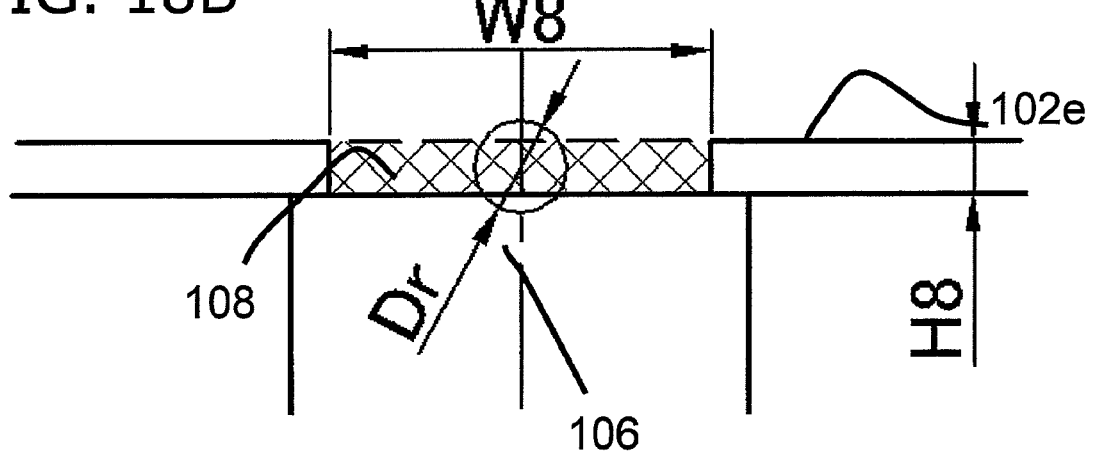

Working Example 7 shown in FIG. 18 is a modification of the radial direction communicating path in Working Example 1.

In an example of the specific dimensions of the axial direction communicating path 106, the outer peripheral radius Rs of the sleeve 102 is 2.85 mm, the depth Y6 of the arc from the outer peripheral side surface of the sleeve 102 is 0.2 mm, and the lateral width W6 of the axial direction communicating path 106 in the circumferential direction is 1.2 mm. The channel cross sectional area Aa of the axial direction communicating path 106 is 0.1612 mm². The cross section circumferential length La is 2.4498 mm. Therefore, the equivalent diameter Da is 0.2632 mm from Formula 2.

The radial cross sectional shape of the radial direction communicating path 108 is rectangular, and in an example of the specific dimensions thereof, the width W8 is 1.0 mm and the height H8 is 0.14 mm. The channel cross sectional area Ar here is 0.14 mm². The cross section circumferential length Lr is 2.28 mm. Therefore, the equivalent diameter Dr is 0.2456 mm.

Here, the cross section circumferential length La of the axial direction communicating path 106 is greater than the cross section circumferential length Lr of the radial direction communicating path 108. That is, Dr<Da and Lr<La. As will be discussed below, in this Working Example 7 the adhesive leaks out to the axial direction communicating path 106.

The shapes in Working Examples 1 to 7, and the results of experimentally evaluating leakage of the adhesive to the communicating path are compiled in Table 1.

TABLE 1

|     | Wor. Ex. 1 | Wor. Ex. 2 | Wor. Ex. 3 | Wor. Ex. 4 | Wor. Ex. 5 | Wor. Ex. 6 | Wor. Ex. 7 |
| --- | --- | --- | --- | --- | --- | --- | --- |
| Aa | 0.1612 | 0.1257 | 0.1257 | 0.0707 | 0.1612 | 0.1612 | 0.1612 |
| La | 2.4498 | 1.2566 | 1.2566 | 0.9425 | 2.4498 | 2.4498 | 2.4498 |
| Da | 0.2633 | 0.4000 | 0.4000 | 0.3000 | 0.2633 | 0.2633 | 0.2633 |
| Ar | 0.1500 | 0.1361 | 0.3000 | 0.5462 | 0.2600 | 0.1800 | 0.1400 |
| Lr | 3.2000 | 1.6660 | 3.4000 | 16.6539 | 3.0000 | 2.3600 | 2.2800 |
| Dr | 0.1875 | 0.3267 | 0.3529 | 0.1312 | 0.3467 | 0.3051 | 0.2456 |
| La/Lr | 0.7656 | 0.7543 | 0.3696 | 0.0566 | 0.8166 | 1.0381 | 1.0745 |
| Da/Dr | 1.4040 | 1.2243 | 1.1333 | 2.2870 | 0.7594 | 0.8629 | 1.0718 |
| Rating | pass | pass | pass | pass | fail | fail | fail |

Figure 19:
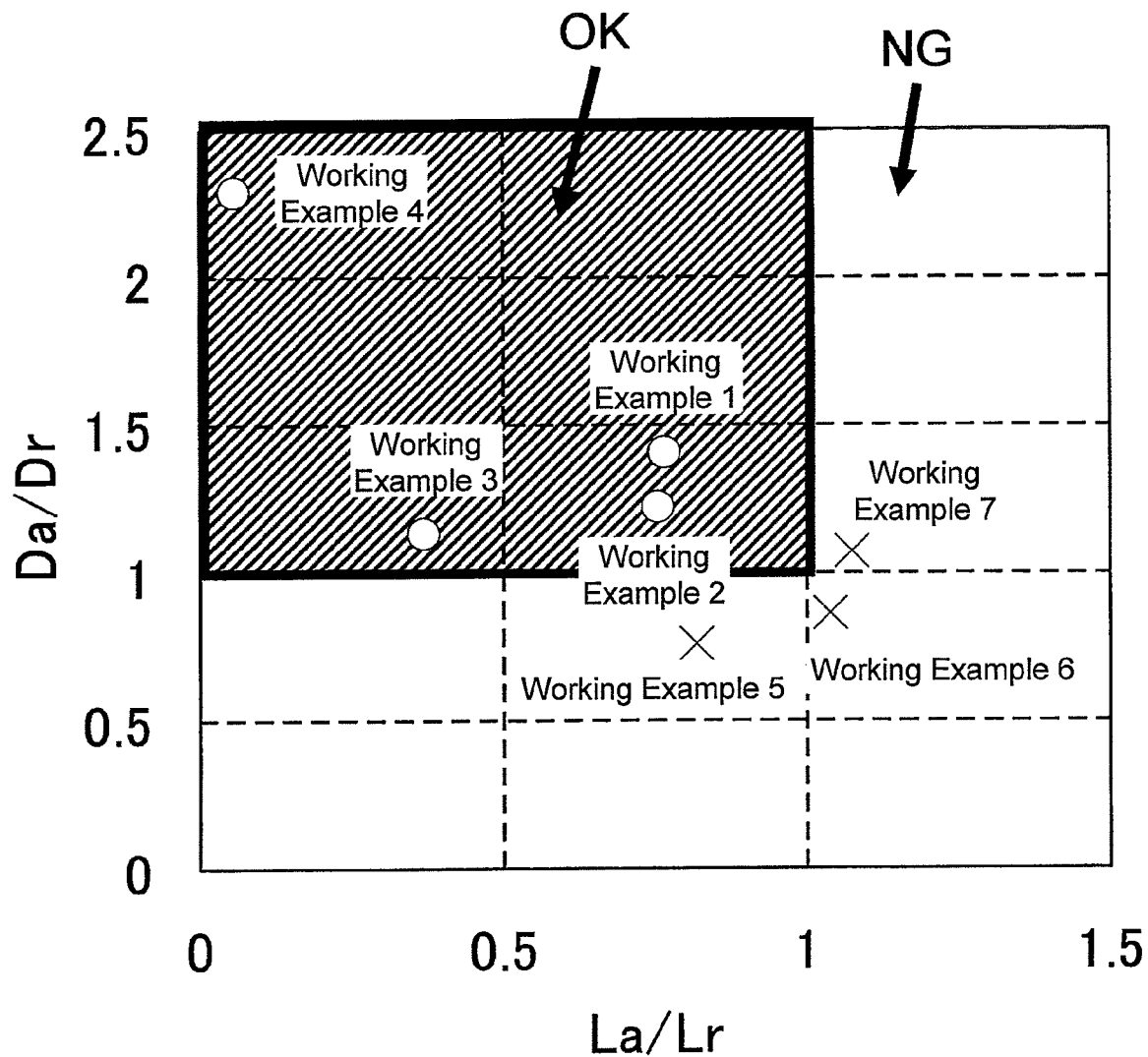
FIG. 19 is a graph of the results of evaluating adhesive leakage and channel parameters in Working Examples 1 to 7.

FIG. 19 is a graph of the results in Table 1, and it can be seen that there is no leakage if Da>Dr and Lr>La. With any other relationship, there was considerable leakage of the adhesive to the axial direction communicating path 106.

This tells us that if Da>Dr and Lr>La are satisfied, then leakage to the axial direction communicating path, which is a portion where there is not supposed to be any adhesive, can be suppressed.

As shown in FIG. 19C, the aperture angle ξ in the circumferential direction of the axial direction communicating path 106 when viewed from the axial direction should be smaller than the aperture angle γ in the circumferential direction of the radial direction communicating path 108.

The aperture angle ξ here is the aperture angle with respect to the axial center O of the shaft for two line segments formed by linking this axial center O with the both ends B1 and B2 in the circumferential direction when the axial direction communicating path 106 is viewed in the axial direction. The aperture angle γ is the aperture angle with respect to the axial center O of the shaft for two line segments formed by linking this center axis O with the both ends C1 and C2 in the circumferential direction of the radial direction communicating path 108 when viewed from the axial direction.

The axial direction communicating path 106 when viewed in the axial direction is set to be within the range in which the radial direction communicating path 108 opens in the circumferential direction. Accordingly, the adhesive is effectively prevented from infiltrating the axial direction communicating path 106. That is better, the range of the aperture angle ξ is within the range of the aperture angle γ.

The shapes in Working Examples 1 to 7 are not limited to the numerical values given in the description of the working examples above or in Table 1.

Embodiment 4

Figure 20:
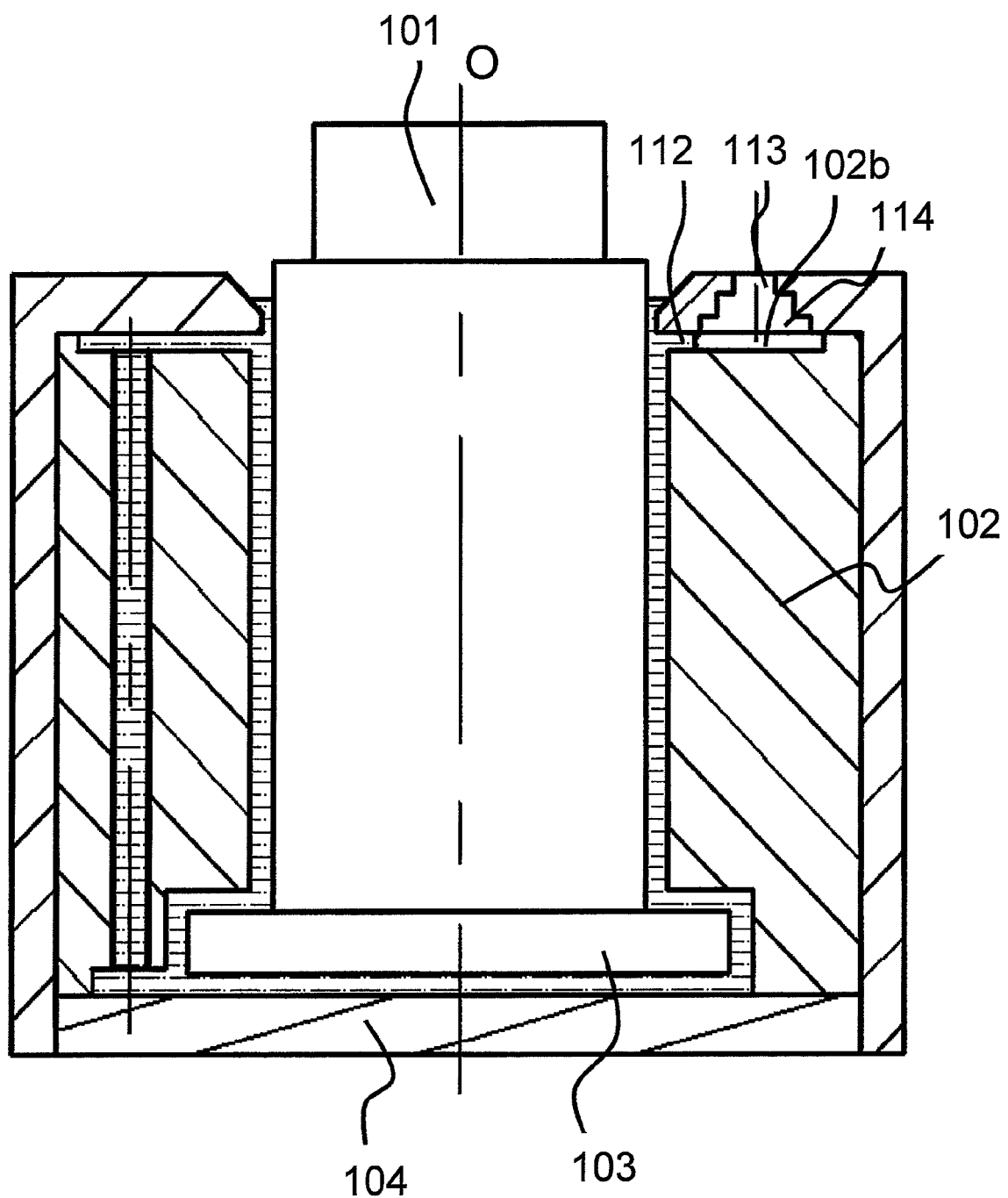
FIG. 20 is a cross section of the hydrodynamic bearing device in Embodiment 4.

FIG. 20 is a cross section of the hydrodynamic bearing device in Embodiment 4, in which the axial direction communicating path 106 in Embodiment 3 is changed to a cylindrical shape, and the shape of the communicating path is similar to that in the above-mentioned Working Example 2, etc.

Figure 21A:
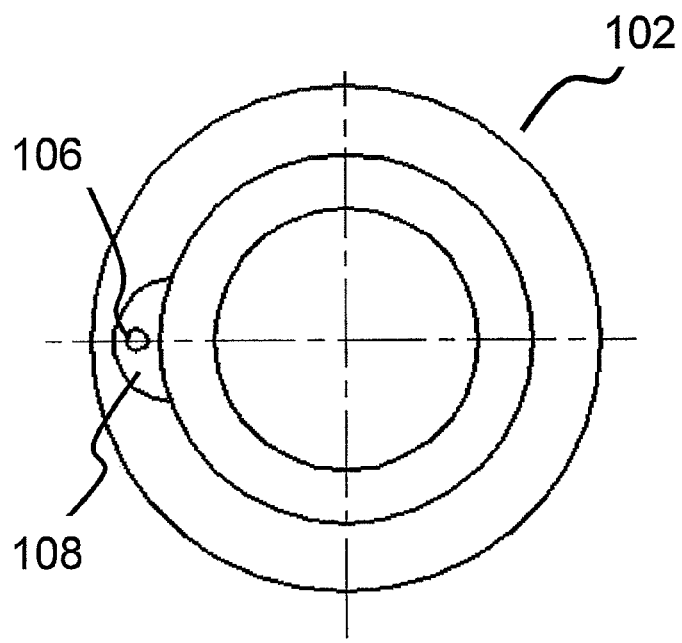
FIG. 21 is a plan view and an oblique view of the sleeve in the hydrodynamic bearing device in Embodiment 4.
Figure 21B:
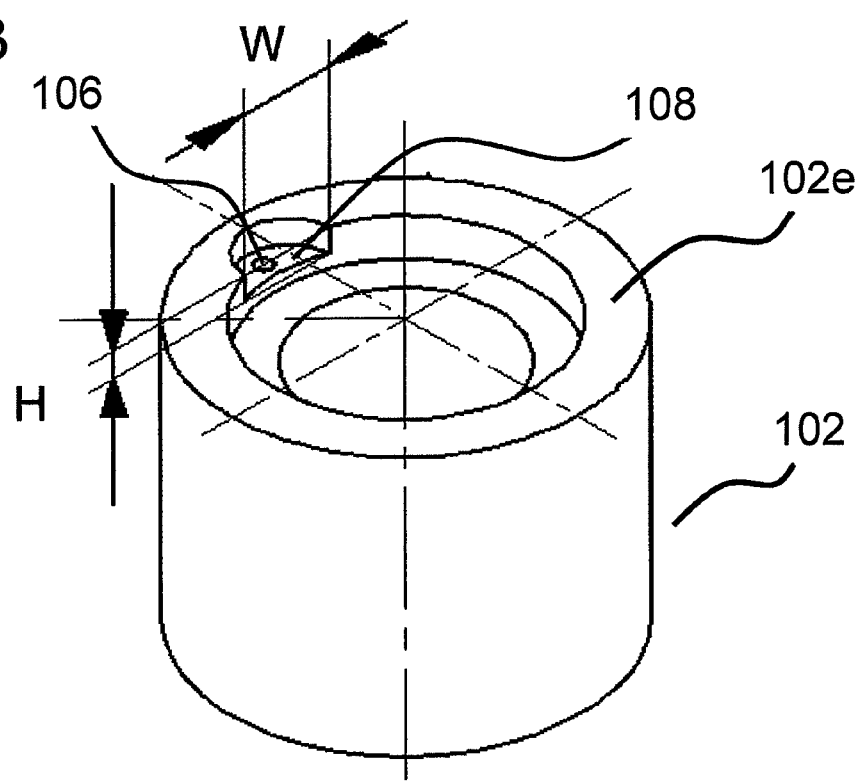
Figure 22A:
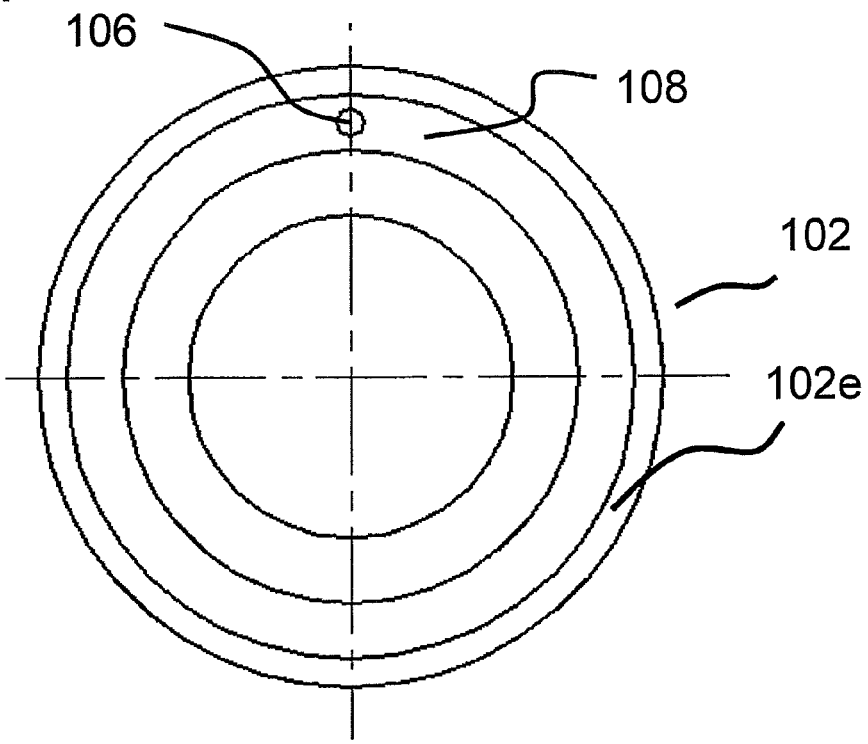
FIG. 22 is a plan view and an oblique view of the sleeve in the hydrodynamic bearing device in a modification of Embodiment 4
Figure 22B:
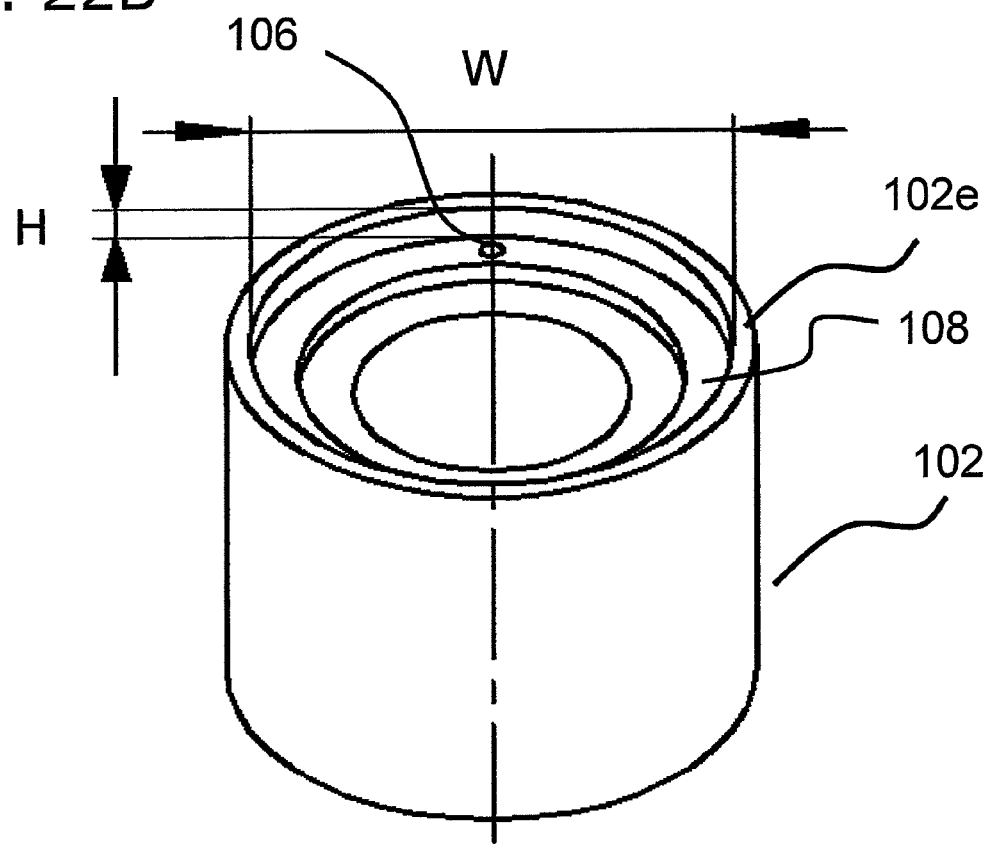

As shown in FIGS. 21A and 21B, the sleeve 102 here has a radial direction communicating path 108 in which the radial direction cross section has a semicircular arc shape with a width W and a height H. Or, with the sleeve 102 shown in FIGS. 22A and 22B, the radial direction communicating path 108 may have a circular shape with a width W and a height H.

In either case, as long as Da>Dr and Lr>La, it will be possible to reduce leakage of the adhesive to the portion of the communicating path where there is not supposed to be any adhesive.

Embodiment 5

Figure 23:
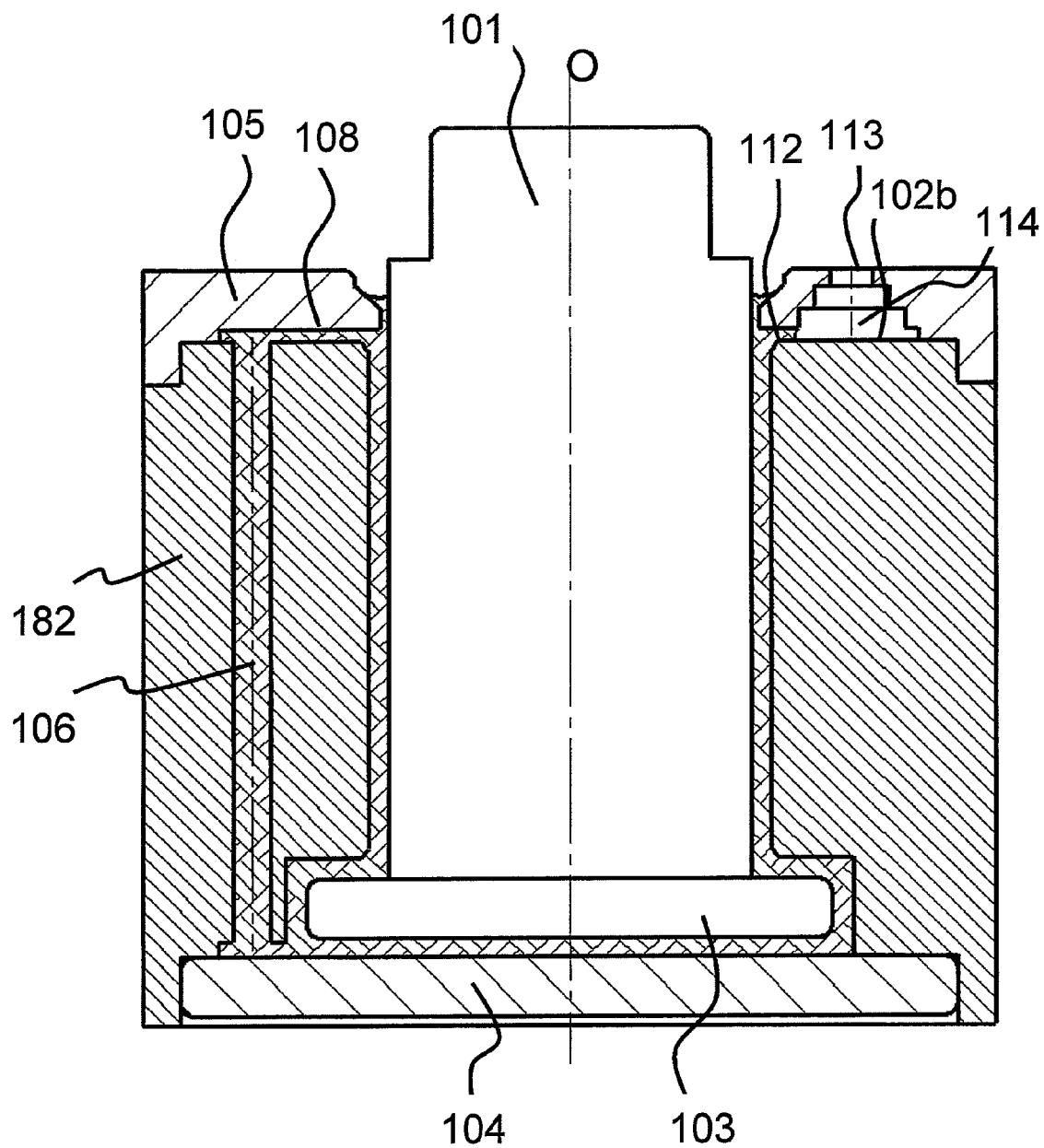
FIG. 23 is a cross section of the hydrodynamic bearing device in Embodiment 5.

FIG. 23 is a diagram in which the opening of a sleeve 182 is covered by a cover member 105, rather than the holder 107 shown in FIG. 8.

Again with this constitution, as long as the radial direction communicating path 108 and the axial direction communicating path 106 formed between the sleeve 182 and the cover member 105 satisfy Da>Dr and Lr>La, it will be possible to reduce leakage of the adhesive to the portion of the communicating path where there is not supposed to be any adhesive.

Embodiment 6

FIGS. 24A, 24B, 24C, and 24D are diagrams in which an adhesive reservoir groove 115, which is a recess in the horizontal bottom surface of the sleeve 102, is formed between the axial direction communicating path 106 and the end of the radial direction communicating path 108 in the circumferential direction, so as to intersect with a straight line linking the centroid 106a of the axial direction communicating path 106 and the ends 102p, 102q, 102r, and 102s of the radial direction communicating path 108 in the circumferential direction.

The centroid referred to here is the center of the figure, and matches up with the center of gravity in the figure.

Figure 24A:
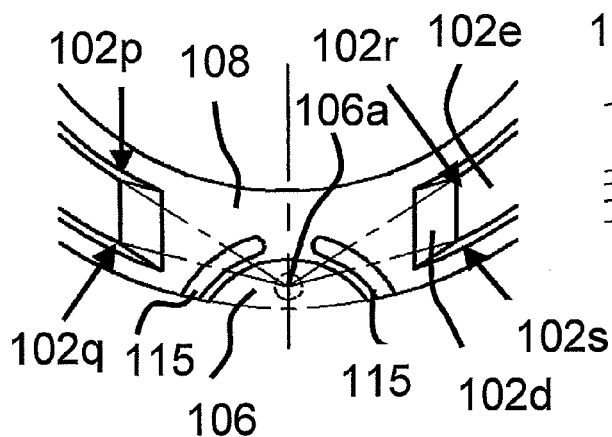
FIG. 24 is a plan view and an oblique view of the area near the communicating path in Embodiment 6, and a plan view and an oblique view of the area near the communicating path in a modification thereof.
Figure 24B:
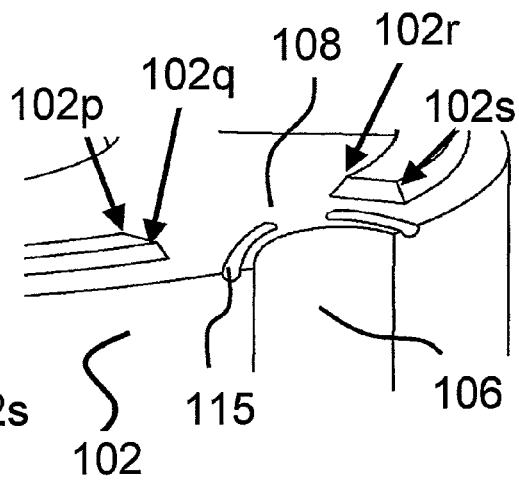
Figure 24C:
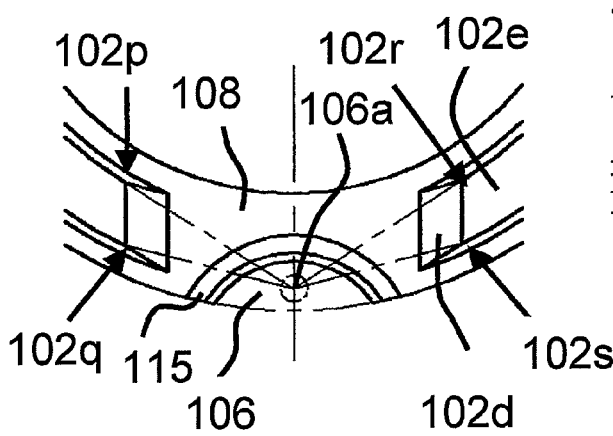
Figure 24D:
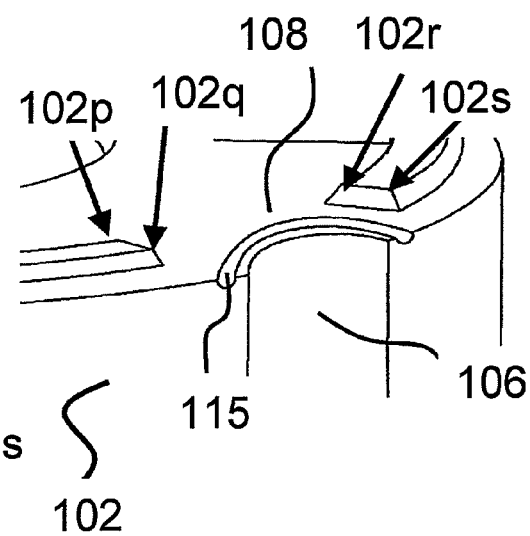

The adhesive reservoir groove 115 may be divided in two as shown in FIGS. 24A and 24B, or may be continuous as in FIGS. 24C and 24D.

The effect is that excess adhesive can be prevented from infiltrating and completely plugging up the axial direction communicating path 106.

Embodiment 7

Figure 25A:
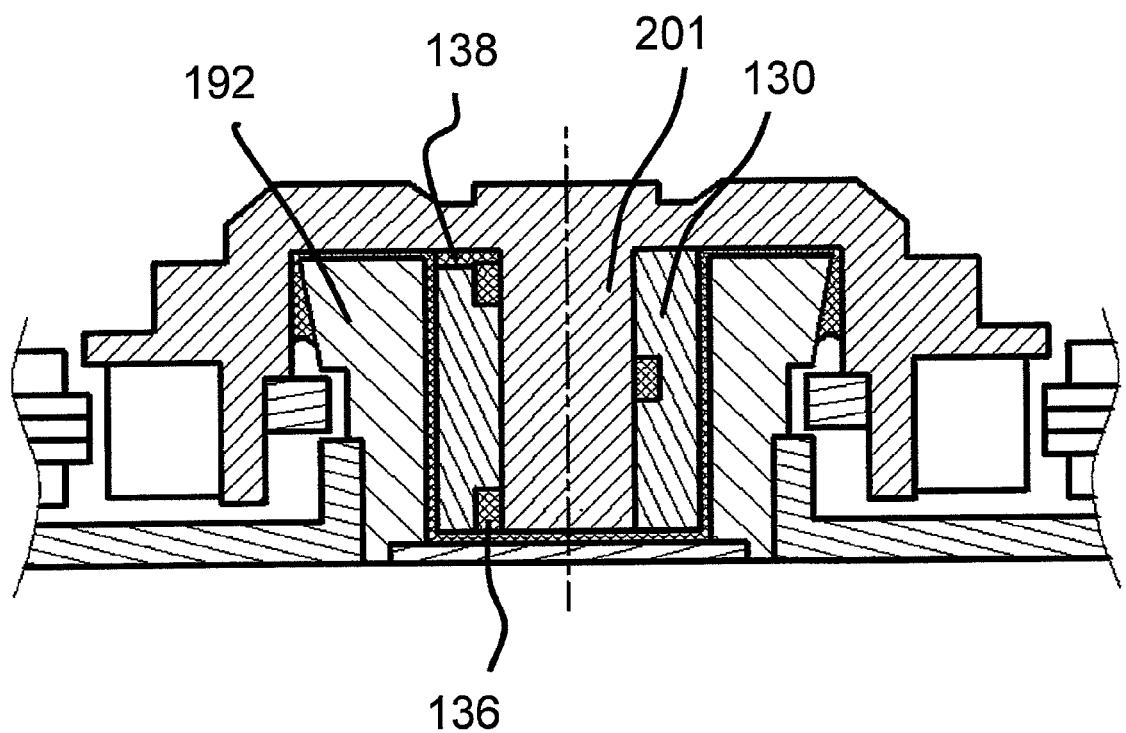
FIG. 25 is a cross section of the spindle motor in Embodiment 7, and an oblique view of the outer cylinder member used in this spindle motor.
Figure 25B:
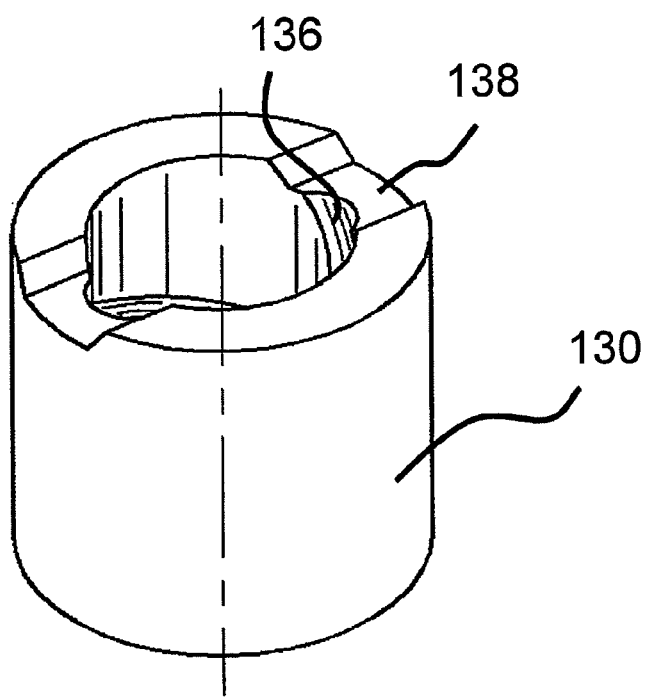

Here, the outer cylinder member 130 shown in FIG. 25B is fixed with an adhesive to the shaft 201 shown in FIG. 25A. A radial bearing is formed in the tiny gap between the outer periphery of the outer cylinder member 130 and a sleeve 192.

Here, a spiral axial direction communicating path 136 is formed around the inside of the outer cylinder member 130, and a radial direction communicating path 138 is formed at the upper end.

Again in this embodiment, when the equivalent diameter Dr of a channel cross section of the radial direction communicating path 138 is compared to the equivalent diameter Da of a channel cross section of the axial direction communicating path, Da>Dr, and when the cross section circumferential length Lr in the radial direction is compared to the axial direction circumferential length La, Lr>La.

This prevents excess adhesive from infiltrating the axial direction communicating path 106.

INDUSTRIAL APPLICABILITY

The hydrodynamic bearing device of the present invention is particularly favorable for magnetic disk drive devices, optical disk drive devices, and so forth, but is not limited to these. For instance, it can be applied to a wide range of products that make use of hydrodynamic bearing devices, such as a rotational head driving device, a spindle motor for a polygon mirror, or a CPU cooler.

The invention claimed is:

1. A hydrodynamic bearing device, comprising:
a shaft;
a sleeve that has a bearing hole in which the shaft is relatively rotatably inserted via a tiny gap;
a cover member that is fixed to the sleeve with an adhesive so as to cover at least part of an end surface of the sleeve at one end in the axial direction, or at least part of a cylinder surface on the outer peripheral side of the sleeve;
a communicating path that is formed between the cylinder surface on the outer peripheral side of the sleeve and the inner peripheral surface of the cover member and passes through in the axial direction from the end surface at one end toward the end surface at the other end in the axial direction, or is formed between the end surface at one end of the sleeve and the cover member and passes through from the bearing hole to the outer peripheral side of the sleeve in the radial direction;
a lubricant that fills a space including at least the tiny gap and the communicating path;
a hydrodynamic bearing portion that rotates and floats the shaft relative to the sleeve when the shaft and the sleeve rotate relatively to one another; and
an adhesive inflow portion that is disposed on both sides in the circumferential direction of the communicating path and is where the adhesive, which fixes the sleeve and the cover member, flows in.

2. The hydrodynamic bearing device according to claim 1, wherein the communicating path includes an axial direction communicating path that passes through from the end surface of the sleeve at one end toward the end surface at the other end in the axial direction, and a radial direction communicating path that is formed in a gap between the cover member and the end surface of the sleeve at one end, and passes through in the radial direction between the bearing hole and the axial direction communicating path, and a capillary force to which the adhesive is subjected is greater at both ends of the radial direction communicating path in the circumferential direction than at both ends in the circumferential direction of the axial direction communicating path.

3. The hydrodynamic bearing device according to claim 2, wherein the opening angle, with respect to the center axis of the sleeve, of the two line segments formed by respectively linking the center axis and the both ends in the circumferential direction of the axial direction communicating path when viewed in the axial direction is smaller than the opening angle, with respect to the center axis of the sleeve, of the two line segments formed by respectively linking the center axis and the both ends in the circumferential direction of the radial direction communicating path when viewed in the axial direction.

4. The hydrodynamic bearing device according to claim 2, wherein the two line segments formed by respectively linking the center axis of the sleeve and the both ends in the circumferential direction of the axial direction communicating path when viewed in the axial direction are within a range bounded by the two line segments defined by respectively linking the center axis and the both ends in the circumferential direction of the radial direction communicating path when viewed in the axial direction.

5. The hydrodynamic bearing device according to claim 2, further comprising an adhesive reservoir groove that is provided on the end surface at one end of the sleeve, between the axial direction communicating path and the circumferential direction end of the radial direction communicating path, so as to intersect a line segment linking the center of the figure in the axial direction cross section of the axial direction communicating path and the circumferential direction end of the radial direction communicating path.

6. The hydrodynamic bearing device according to claim 1, wherein the adhesive inflow portion is formed such that when the communicating path is viewed in its direction of extension, the cross sectional shape is flat in the circumferential direction, and the cross sectional area gradually decreases moving from the center of the cross section toward the both ends in the circumferential direction.

7. The hydrodynamic bearing device according to claim 6, wherein the radial direction communicating path has a shape of its both ends in the circumferential direction that forms an acute angle when viewed in the radial direction.

8. The hydrodynamic bearing device according to claim 7, wherein the angle formed by the both ends in the circumferential direction of the radial direction communicating path when viewed in the radial direction is at least 2 degrees and no more than 60 degrees.

9. The hydrodynamic bearing device according to claim 1, wherein the communicating path includes an axial direction communicating path that passes through from the end surface of the sleeve at one end toward the end surface at the other end in the axial direction, and a radial direction communicating path that is formed in a gap between the cover member and the end surface of the sleeve at one end, and passes through in the radial direction between the bearing hole and the axial direction communicating path, an equivalent diameter Da of an axial direction cross section of the axial direction communicating path is greater than an equivalent diameter Dr of a radial direction cross section of the radial direction communicating path, and a circumferential length La of an axial direction cross section of the axial direction communicating path is less than a circumferential length Lr of a radial direction cross section of the radial direction communicating path, and the equivalent diameter Da and the equivalent diameter Dr are four times the respective quotients obtained by dividing an axial direction cross sectional area Aa of the axial direction communicating path and a radial direction cross sectional area Ar of the radial direction communicating path by the circumferential length La of the axial direction cross section of the axial direction communicating path and the circumferential length Lr of the radial direction cross section of the radial direction communicating path, and are expressed by the following:

$$Da = 4\frac{Aa}{La}, Dr = 4\frac{Ar}{Lr}$$

10. The hydrodynamic bearing device according to claim 1,
wherein, of wall faces on the cover member side and the sleeve side that constitute the communicating path, the one with a smaller radius of curvature when the communicating path is viewed in its direction of extension has a smaller contact angle with the adhesive in an uncured state.

11. The hydrodynamic bearing device according to claim 1,
wherein, of wall faces on the cover member side and the sleeve side that constitute the communicating path, the one with the smaller radius of curvature when the communicating path is viewed in its direction of extension has a greater surface roughness.

12. The hydrodynamic bearing device according to claim 1,
wherein coefficient of thermal expansion of the sleeve is greater than the coefficient of thermal expansion of the cover member.

13. A spindle motor in which the hydrodynamic bearing device according to claim 1 is installed.

14. An information apparatus in which the spindle motor according to claim 13 is installed.

15. A hydrodynamic bearing device, comprising:
a center shaft member having a flange on at least one end in the axial direction;
an outer cylinder member that is fitted over the center shaft member and is fixed to the center shaft member with an adhesive;
a sleeve that has a bearing hole in which the outer cylinder member is relatively rotatably inserted via a tiny gap;
a communicating path that is formed between the outer cylinder member and the center shaft member and passes through from one end in the axial direction toward the other end in the axial direction, or is formed between the flange of the center shaft member and the end of the outer cylinder member and passes through in the radial direction from the bearing hole to the inner peripheral surface of the outer cylinder member;
a lubricant that fills a tiny space including at least the tiny gap and the communicating path; and
an adhesive inflow portion that is disposed on both sides in the circumferential direction of the communicating path and is where the adhesive, which fixes the center shaft member and the outer cylinder member, flows in.

16. The hydrodynamic bearing device according to claim 15,
wherein the communicating path includes an axial direction communicating path that is formed in a gap between the center shaft member and the outer cylinder member and passes through from one end in the axial direction toward the other end in the axial direction, and a radial direction communicating path that is formed in a gap between the center shaft member and the outer cylinder member end surface and passes through in the radial direction between the bearing hole and the axial direction communicating path, and
a capillary force to which the adhesive is subjected is greater at both ends in the circumferential direction of the radial direction communicating path than at both ends in the circumferential direction of the axial direction communicating path.

17. The hydrodynamic bearing device according to claim 16,
further comprising an adhesive reservoir groove that is provided on the end surface at one end of the outer cylinder member, between the axial direction communicating path and the circumferential direction end of the radial direction communicating path, so as to intersect a line segment linking the center of the figure in the axial direction cross section of the axial direction communicating path and the circumferential direction end of the radial direction communicating path.

18. The hydrodynamic bearing device according to claim 15,
wherein the adhesive inflow portion is formed such that when the communicating path is viewed in its direction of extension, the cross sectional shape is flat in the circumferential direction, and the cross sectional area gradually decreases moving from the center of the cross section toward the both ends in the circumferential direction.

19. The hydrodynamic bearing device according to claim 15,
wherein, of wall faces on the center shaft member side and the outer cylinder member side that constitute the communicating path, the one with the smaller radius of curvature when the communicating path is viewed in its direction of extension has a smaller contact angle with the adhesive in an uncured state.

20. The hydrodynamic bearing device according to claim 15,
wherein, of wall faces on the center shaft member side and the outer cylinder member side that constitute the communicating path, the one with the smaller radius of curvature when the communicating path is viewed in its direction of extension has a greater surface roughness.

21. The hydrodynamic bearing device according to claim 15,
wherein the coefficient of thermal expansion of the center shaft member is greater than the coefficient of thermal expansion of the outer cylinder member.

22. The hydrodynamic bearing device according to claim 15,
   wherein the communicating path includes an axial direction communicating path that is formed in a gap between the center shaft member and the outer cylinder member and passes through from one end in the axial direction toward the other end in the axial direction, and a radial direction communicating path that is formed in a gap between the center shaft member and the outer cylinder member end surface and passes through in the radial direction between the bearing hole and the axial direction communicating path,
   an equivalent diameter Da of an axial direction cross section of the axial direction communicating path is greater than an equivalent diameter Dr of a radial direction cross section of the radial direction communicating path, and a circumferential length La of an axial direction cross section of the axial direction communicating path is less than a circumferential length Lr of a radial direction cross section of the radial direction communicating path, and
   the equivalent diameter Da and the equivalent diameter Dr are four times the respective quotients obtained by dividing an axial direction cross sectional area Aa of the axial direction communicating path and a radial direction cross sectional area Ar of the radial direction communicating path by the circumferential length La of an axial direction cross section of the axial direction communicating path and the circumferential length Lr of a radial direction cross section of the radial direction communicating path, and are expressed by the following:

$$Da = 4\frac{Aa}{La}, Dr = 4\frac{Ar}{Lr}$$

* * * * *